United States Patent
Nagao et al.

(10) Patent No.: US 7,605,818 B2
(45) Date of Patent: *Oct. 20, 2009

(54) IMAGE PROCESSING DEVICE, METHOD, AND STORAGE MEDIUM WHICH STORES A PROGRAM

(75) Inventors: Takashi Nagao, Ashigarakami-gun (JP); Noriaki Seki, Ebina (JP); Yukio Kumazawa, Ashigarakami-gun (JP); Youichi Isaka, Ashigarakami-gun (JP); Yasuhiko Kaneko, Ashigarakami-gun (JP); Junichi Kaneko, Ebina (JP)

(73) Assignees: Fuji Xerox Co., Ltd., Tokyo (JP); Fuji Photo Film Co., Ltd., Kanagawa (JP)

( * ) Notice: Subject to any disclaimer, the term of this patent is extended or adjusted under 35 U.S.C. 154(b) by 578 days.

This patent is subject to a terminal disclaimer.

(21) Appl. No.: 11/291,915

(22) Filed: Dec. 2, 2005

(65) Prior Publication Data

US 2006/0274969 A1     Dec. 7, 2006

(30) Foreign Application Priority Data

Jun. 3, 2005     (JP)     ............................. 2005-164192

(51) Int. Cl.
*G06F 15/00* (2006.01)
*G06T 1/00* (2006.01)
*G09G 5/39* (2006.01)
*G06T 1/20* (2006.01)
*G06F 13/00* (2006.01)

(52) U.S. Cl. ........................ 345/501; 345/531; 345/506; 345/537

(58) Field of Classification Search ................. 345/506, 345/531, 501, 537
See application file for complete search history.

(56) References Cited

U.S. PATENT DOCUMENTS

| 4,741,047 A | | 4/1988 | Sharpe | |
|---|---|---|---|---|
| 4,918,541 A | * | 4/1990 | Ishida et al. | ................. 382/235 |
| 5,692,210 A | * | 11/1997 | Mita et al. | ................... 345/502 |
| 6,028,611 A | * | 2/2000 | Anderson et al. | ........... 345/506 |
| 2002/0145610 A1 | * | 10/2002 | Barilovits et al. | ........... 345/538 |
| 2003/0001851 A1 | * | 1/2003 | Bushey | ........................ 345/506 |
| 2003/0169262 A1 | * | 9/2003 | Lavelle et al. | ................ 345/531 |

(Continued)

FOREIGN PATENT DOCUMENTS

JP     05-260373     10/1993

(Continued)

*Primary Examiner*—Kimbinh T Nguyen
*Assistant Examiner*—David T Welch
(74) *Attorney, Agent, or Firm*—Oliff & Berridge, PLC

(57) ABSTRACT

An image processing device including an image processing section having one or more image processing modules and buffer modules having a buffer is provided. The buffer module, recognizes a number of image processing modules which are connected at the following stage of its own module; stores, for each of the following image processing modules, a head position of un-read image data among image data which is stored in the buffer; and each time image data is requested from an following image processing module, causes the image processing module to read, in a read data amount which is set in advance for its own module at each of the individual following image processing modules or which is designated each time of the request, image data which is stored in the buffer, from the head position corresponding to the image processing module.

11 Claims, 23 Drawing Sheets

U.S. PATENT DOCUMENTS

| | | | |
|---|---|---|---|
| 2004/0199740 A1* | 10/2004 | Makela et al. | 711/170 |
| 2005/0125676 A1* | 6/2005 | Fujiwara et al. | 713/182 |
| 2005/0140787 A1* | 6/2005 | Kaplinsky | 348/207.1 |
| 2006/0165109 A1* | 7/2006 | Kitamura et al. | 370/412 |

FOREIGN PATENT DOCUMENTS

| | | |
|---|---|---|
| JP | 07-105020 | 4/1995 |
| JP | 08-272981 | 10/1996 |
| JP | 09-116660 | 5/1997 |

* cited by examiner

EXAMPLES OF STRUCTURES OF IMAGE PROCESSING SECTION

NOTE THAT (M): IMAGE PROCESSING MODULE [B]: BUFFER MODULE

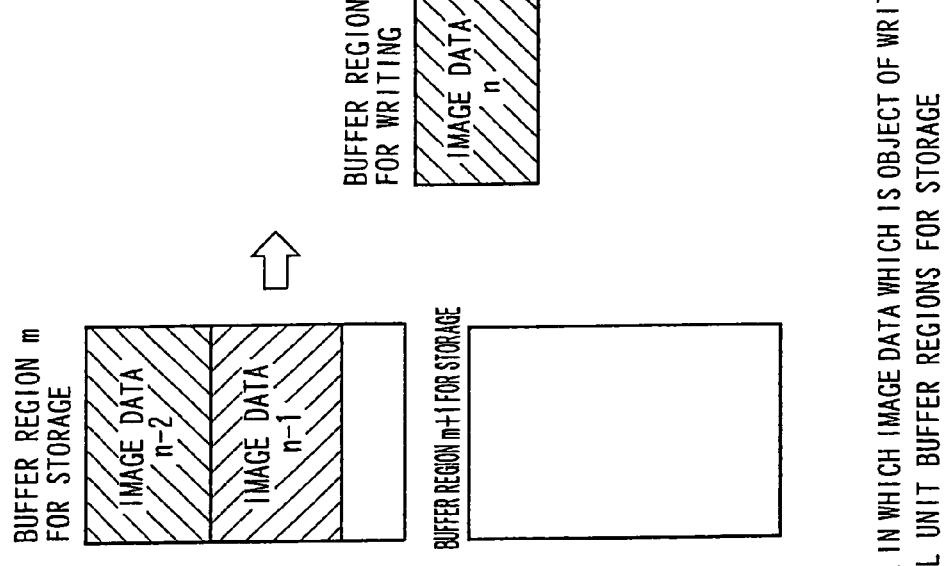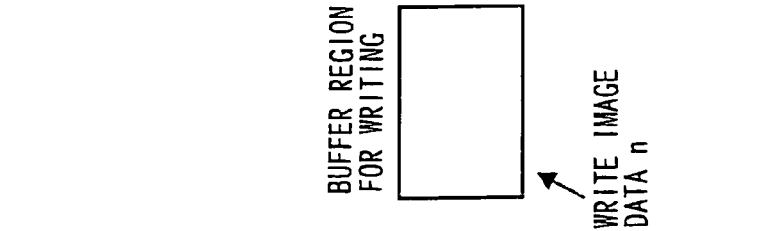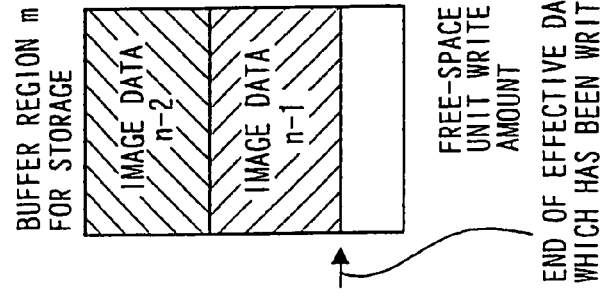
PROCESSING IN A CASE IN WHICH IMAGE DATA WHICH IS OBJECT OF WRITING EXTENDS OVER PLURAL UNIT BUFFER REGIONS FOR STORAGE

SCHEMATIC STRUCTURE/PROCESSING OF IMAGE PROCESSING MODULE

SCHEMATIC STRUCTURE/PROCESSING OF BUFFER MODULE
(A CASE IN WHICH IMAGE DATA REQUESTED FROM FOLLOWING STAGE IS NOT STORED IN BUFFER)

BLOCK UNIT IMAGE PROCESSING IN AN EMBODIMENT IN WHICH BUFFER MODULE DIRECTLY REQUESTS IMAGE DATA FROM IMAGE PROCESSING MODULE OF PRECEDING STAGE

IMAGE PROCESSING DEVICE, METHOD, AND STORAGE MEDIUM WHICH STORES A PROGRAM

CROSS-REFERENCE TO RELATED APPLICATION

This application claims priority under 35 USC 119 from Japanese Patent Application No. 2005-164192, the disclosure of which is incorporated by reference herein.

BACKGROUND

1. Technical Field

The present invention relates to an image processing device, method, and a storage medium which stores a program, and in particular, to an image processing device equipped with an image processing section which is constructed to include one or more image processing modules selected from among plural types of image processing modules, and to an image processing method which can be applied to the image processing device, and to a storage medium which stores an image processing program for making a computer function as the image processing device.

2. Related Art

Various types of image processings, such as enlargement/reduction, rotation, affine transformation, color conversion, filtering processing, image composing are carried out on inputted image data at an image processing device, a DTP (desktop publishing) system, a printing system and the like. In such devices and systems, when the attributes of inputted image data or the contents, procedures, parameters and the like are fixed, the image processings are carried out by hardware which is designed for exclusive use therefor. However, when the attributes are changed variously or when various image data which have different color space or different numbers of bits per pixel are inputted as the inputted image data, a structure of the image processings needs to be changed flexibly. In order to satisfy such a demand, there are some techniques in which programmable processing modules are connected in a pipeline form or a DAG (directed acyclic graph) form.

However, there are the following problems. At each of the image processing modules, there is a unit which is easy to process in accordance with the type and the contents of the image processing (e.g., a unit of a pixel, a unit of one line, a unit of plural lines, a unit of one whole image, or the like). In order to combine the respective image processing modules in an arbitrary order and carry out processings in cooperation with one another, the units of output of all of the image processing modules must be made to be uniform, or each of the image processing modules must be structured. Therefore, the structures of the image processing modules become complex. Further, since each of the image processing modules operates in concert with other image processing modules, each image processing module needs a section which controls the processings of receipt and transfer of image data to and from the other image processing modules which are connected to its own module in addition to a section which actually carries out image processing on the inputted image data. Therefore, the structure of each image processing module becomes even more complex.

Moreover, each buffer memory is structured to hold a region corresponding to the processing contents of the image processing modules connected therebefore and thereafter, and merely functions only to hold the midway progress of the processings. Therefore, when a given image processing module is changed, the capacities need to be changed in accordance with the processing contents of that image processing module and the processing contents of the image processing modules which are before and after the buffer memories or the like.

SUMMARY

The present invention was made in view of the aforementioned, and provides an image processing device, an image processing method, and a storage medium which stores an image processing program, which combine arbitrary image processing modules and can cause desired image processings to be carried out, without leading to complexity of the structures of the individual image processing modules.

An aspect of the present invention provides an image processing device including: an image processing section, the image processing section having: (A) one or more image processing modules, each image processing module having: (1) an image processing engine carrying out a predetermined image processing on image data in units of a unit processing data amount which is set in advance, and (2) a control section inputting image data, which is acquired from a preceding stage of its own module, in data amount units needed in order for the image processing engine to carry out processing in units of the unit processing data amount, and outputting, to a following stage of its own module, image data, which has undergone a predetermined image processing by the image processing engine, or processing results of the predetermined image processing, the one or more image processing modules being selected from a plurality of types of image processing modules at which types or contents of image processings carried out by the image processing engines are different from one another; and (B) one or more buffer modules having a buffer for storing image data, the image processing section being constructed by individual modules being connected in a pipeline form or a directed acyclic graph form, such that the buffer module is connected at at least one of a preceding stage and a following stage of each image processing module which is selected, and the buffer module having a buffer control section, wherein the buffer control section: in a case in which an image processing module is connected at a following stage of its own module, recognizes a number of image processing modules which are connected at the following stage of its own module, stores, for each of the image processing modules of the following stage, a head position of un-read image data among image data which is stored in the buffer, and each time image data is requested from an arbitrary image processing module of the following stage of its own module, carries out processing of making each image processing module which is a read request source read, in a read data amount which is set in advance for its own module at each of the individual image processing modules of the following stage of its own module or which is designated each time image data is requested, image data which is stored in the buffer, from the head position corresponding to the image processing module which is the read request source.

The image processing module relating to the present invention has an image processing engine and a control section. The image processing engine carries out a predetermined image processing on image data in units of a unit processing data amount which is set in advance. The control section inputs image data, which is acquired from a preceding stage of its own module, in data amount units needed in order for the image processing engine to carry out processing in units of the unit processing data amount, and outputs, to a following stage of its own module, image data, which has undergone the predetermined image processing by the image processing engine, or processing results of the predetermined image processing. In the present invention, plural types of image processing modules, at which the types or the contents of the image processings carried out by the image processing engines are different from one another, are readied. The image processing section is constructed by using one or more image processing modules which are selected from among the plural types of image processing modules. Note that the image processing modules, which are selected in order to construct the image processing section, may be image processing modules which are respectively different, or may be selected such that portions or entireties of the image processing modules overlap one another. In the present invention, the image processing section is constructed by individual modules being connected in a pipeline form or a directed acyclic graph form, such that a buffer module, which has a buffer for storing image data, is connected at at least one of the preceding stage and the following stage of each image processing module which is selected.

The buffer module relating to the present invention has a buffer control section. In a case in which an image processing module is connected at a following stage of its own module, the buffer control section recognizes a number of image processing modules which are connected at the following stage of its own module. The buffer control section stores, for each of the image processing modules of the following stage, a head position of un-read image data among image data which is stored in the buffer. Each time image data is requested from an arbitrary image processing module of the following stage of its own module, the buffer control section carries out a processing of making an image processing module which is a read request source read, in a read data amount which is set in advance for its own module at each of the individual image processing modules of the following stage of its own module or which is designated each time image data is requested, image data which is stored in the buffer, from the head position corresponding to the image processing module which is the read request source.

Note that the aforementioned unit processing data amount and write data amount may be one line of the image, or may be any of an arbitrary number of bytes including plural lines of the image, one whole image, one pixel of the image, or the like. Further, the causing of reading of image data from the buffer may be carried out by informing the image processing module of the following stage of its own module of the address of the storage region in which the image data which is the object of reading is stored, or may be carried out by copying the data which is the object of reading to the storage region of the address notified from the image processing module of the following stage. The storage region, in which the image data which is the object of reading is stored, may be a storage region at which the stored contents cannot be changed by the image processing module of the following stage, or may be a storage region at which the stored contents can be changed by the image processing module of the following stage.

In this way, in the present invention, even in cases in which plural image processing modules are connected at the following stage of a buffer module, the read data amounts for the times when the individual image processing modules read image data from the buffer module, can be set arbitrarily. Therefore, the image processing module, which is connected at the following stage of the buffer module, does not need to make the unit of acquisition of image data be in line with that of the other image processing modules. Accordingly, the unit processing data amount, at the image processing engine of each image processing module, can be optimized in accordance with the type or the like of the image processing which the image processing engine carries out, and it is possible to realize optimization (increased speed, improved image quality, and the like) of the image processings which the image processing engines of the individual image processing modules carry out.

Further, due to the buffer control section of the buffer module carrying out the above-described control, there is no need for the control section of the image processing module connected at the following stage of the buffer module to recognize the number of image processing modules which are connected at the following stage of the buffer module, and to carry out processings such as switching control in accordance with the recognized number of image processing modules, or the like. Therefore, the structure of the control section of the image processing module can be simplified. Accordingly, in accordance with the present invention, it is possible to combine arbitrary image processing modules and have desired image processings be carried out, without leading to the structures of the individual image processing modules becoming complex.

Due to the above-described structure, the present invention has the excellent effect of combining arbitrary image processing modules and causing desired image processings to be carried out, without leading to the structures of the individual image processing modules becoming complex.

BRIEF DESCRIPTION OF THE DRAWINGS

An embodiment of the present invention will be described in detail based on the following figures, wherein:

FIGS. 9A to 9C are schematic diagrams explaining processings in a case in which image data which is the object of writing extends over plural unit buffer regions for storage;

DETAILED DESCRIPTION

Figure 1:
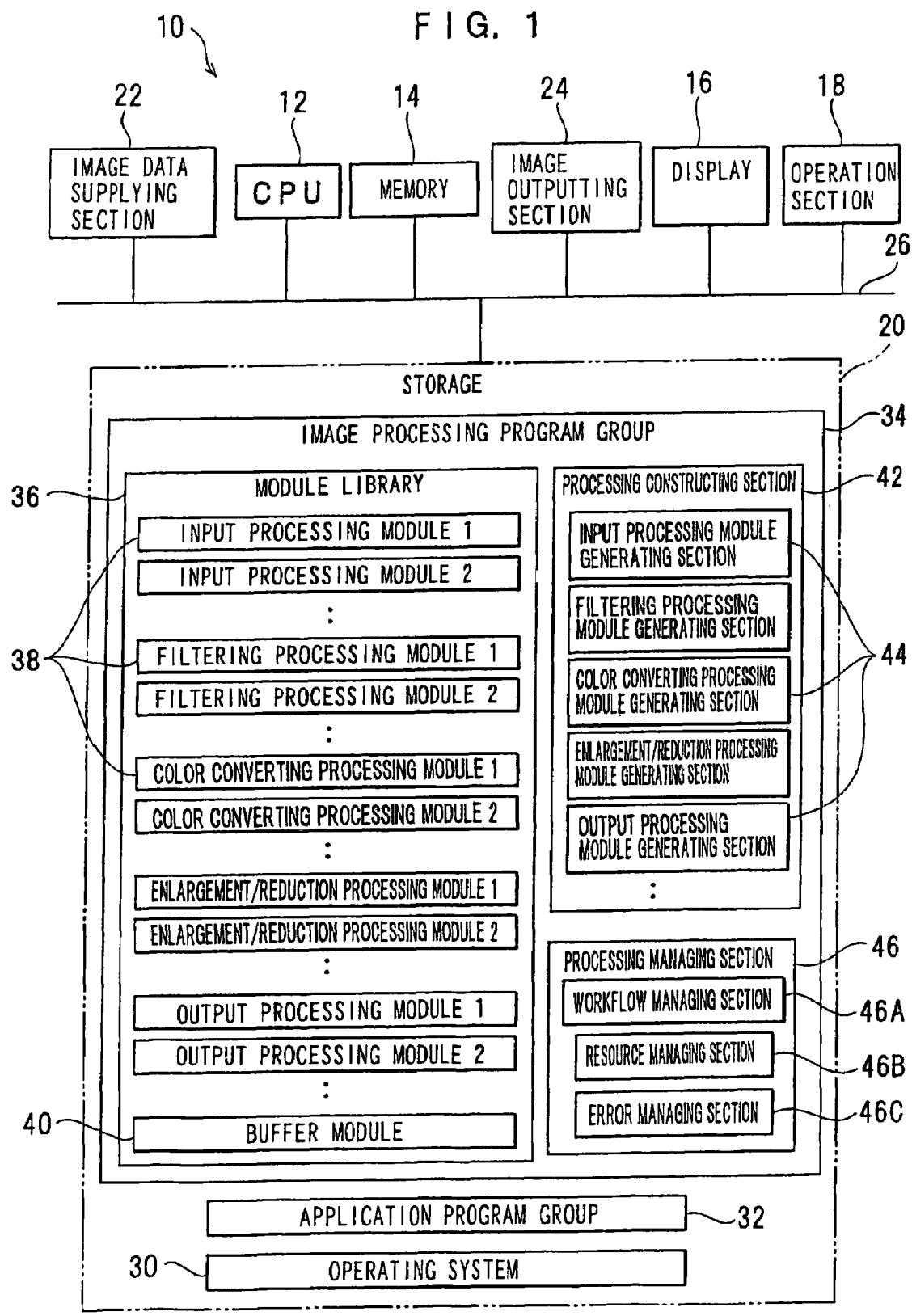
FIG. 1 is a block diagram showing the schematic structure of a computer (image processing device) relating to the embodiment.

Hereinafter, an example of an embodiment of the present invention will be described in detail with reference to the drawings. FIG. 1 shows a computer 10 as an image processing device. This computer 10 may be incorporated into an arbitrary image handling device which must carry out image processings at the interior thereof, such as a copier, a printer, a fax machine, a multifunction device which has the functions of the aforementioned devices, a scanner, a photographing printer, or the like. Also, the computer 10 may be an independent computer such as a personal computer (PC) or the like. Further, the computer 10 may be a computer which is incorporated into a portable device, such as a PDA (personal digital assistant), a cellular phone, or the like.

The computer 10 has a CPU 12, a memory 14, a display 16, an operation section 18, a storage 20, an image data supplying section 22, and an image outputting section 24, and these are connected together via a bus 26. In a case in which the computer 10 is incorporated into an image handling device such those mentioned above, the computer 10 may include, as the display 16 and the operation section 18, a display panel formed from an LCD or the like, a ten key, or the like which are respectively provided at the image handling device. Further, if the computer 10 is an independent computer, the display 16 may be a display and the operation section 18 may be a keyboard, a mouse, or the like, which are connected to the computer. Moreover, an HDD (hard disk drive) is suitable as the storage 20, but instead, another non-volatile storage medium, such as a flash memory or the like, may be used.

The image data supplying section 22 supplies image data which is the object of processing. For example, an image reading section, which reads an image recorded on a recording material such as paper or a photographic film or the like and outputs image data, or a receiving section which receives image data from the exterior via a communication line, or an image storage section (the memory 14 or the storage 20) which stores image data, or the like, can be used as the image data supplying section 22. Further, the image outputting section 24 outputs image data which has undergone image processings, or an image expressed by such image data. For example, an image recording section which records an image expressed by image data onto a recording material such as paper or a photosensitive material or the like, or a display section which displays an image expressed by image data on a display or the like, or a writing device which writes image data to a recording medium, or a transmitting section which transmits image data via a communication line, may be used as the image outputting section 24. Further, the image outputting section 24 may be an image storage section (the memory 14 or the storage 20) which merely stores image data which has undergone image processings.

As shown in FIG. 1, the storage 20 stores, as various types of programs which are executed by the CPU 12, a program of an operating system 30 which governs the management of resources such as the memory 14 or the like, the management of the execution of programs by the CPU 12, the communication between the computer 10 and the exterior, and the like; an image processing program group 34 which makes the computer 10 function as the image processing device relating to the present invention; and programs (shown as "application program group 32" in FIG. 1) of various types of applications 32 which cause the image processing device, which is realized by the CPU 12 executing the aforementioned image processing program group, to carry out desired image processings.

The image processing program group 34 is programs which are developed so as to be able to be used in common at various types of image handling devices and various devices (platforms) such as portable devices, PCs, and the like, for the purpose of reducing the burden of development for developing image processing programs which can be used in the aforementioned various types of image handling devices and portable devices, PCs, and the like. The image processing program group 34 corresponds to the image processing program relating to the present invention. The image processing device which is realized by the image processing program group 34 constructs an image processing section which carries out the image processing(s) and carries out image processing(s) by the image processing section (details will be described later) based on instructions from the application 32. The image processing program group 34 provides the application 32 with an interface for instructing the construction of an image processing section, and for instructing execution of image processing(s) by the constructed image processing section. Therefore, when an arbitrary device which carries out image processing(s) at the interior is newly developed or the like, a program which carries out the image processing(s) can be obtained by merely developing the application 32. The application 32 causes the image processing program group 34 to carry out the image processing(s) needed at that device by using the interface. Since there is no longer the need to newly develop a program which actually carries out the image processing(s), the burden of development can be lessened.

As mentioned above, the image processing device which is realized by the image processing program group 34 constructs an image processing section which carries out the image processing(s) instructed by the application 32, and carries out the image processing(s) by the constructed image processing section. Therefore, even in a case in which, for example, the color space or the number of bits per pixel of the image data which is the object of image processing is unfixed, or the contents, the procedures, the parameters are unfixed due to the application 32 instructing the re-construction of the image processing section. The image processing(s) executed by the image processing device (the image processing section) can be flexibly changed in accordance with the processed image data or the like.

Figure 5A:
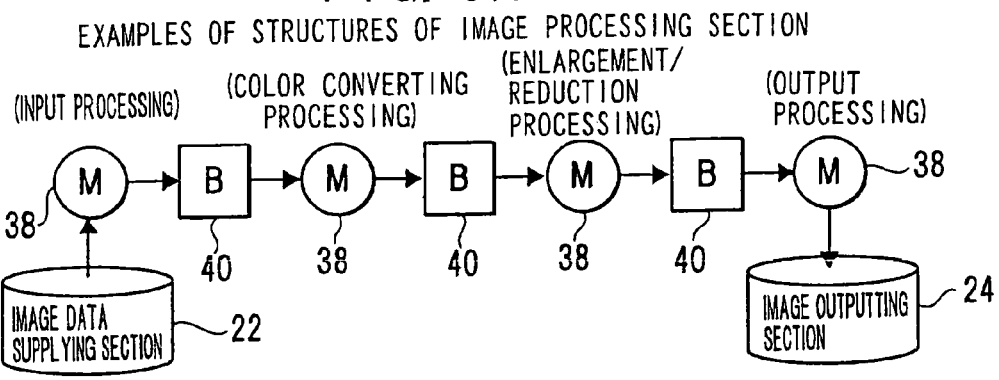
FIGS. 5A to 5C are block diagrams showing structural examples of an image processing section.

The image processing program group 34 will be described hereinafter. As shown in FIG. 1, the image processing program group 34 is broadly divided into a module library 36, programs of a processing constructing section 42 corresponding to the constructing section, and programs of a processing managing section 46. The processing constructing section 42 constructs an image processing section 50 based on an instruction from the application. As shown in FIG. 5, the image processing section 50 is formed by one or more image processing modules 38 and buffer modules 40. They are connected together in a pipeline form or a DAG (directed acyclic graph) form. The image processing modules 38 carry out image processings. The buffer modules 40 store image data and they are disposed at at least one of the preceding and the following stages of the individual image processing modules 38.

Each image processing module itself structuring the image processing section 50 is a first program which is executed by the CPU 12 and which is for causing a predetermined image processing to be carried out at the CPU 12, or a second program which is executed by the CPU 12 and which is for instructing the execution of processing with respect to an external image processing device which is not illustrated in FIG. 1 (e.g., a dedicated image processing board or the like). The programs of the plural types of the image processing modules 38, which carry out respectively different image processings (e.g., input processing, filtering processing, color converting processing, enlargement/reduction processing, skew angle sensing processing, image rotating processing, image composing processing, output processing, and the like), are respectively registered in the module library 36. Hereinafter, in order to simplify explanation, description will be given with each of the individual image processing modules themselves structuring the image processing section 50 being the aforementioned first program.

Figure 15A:
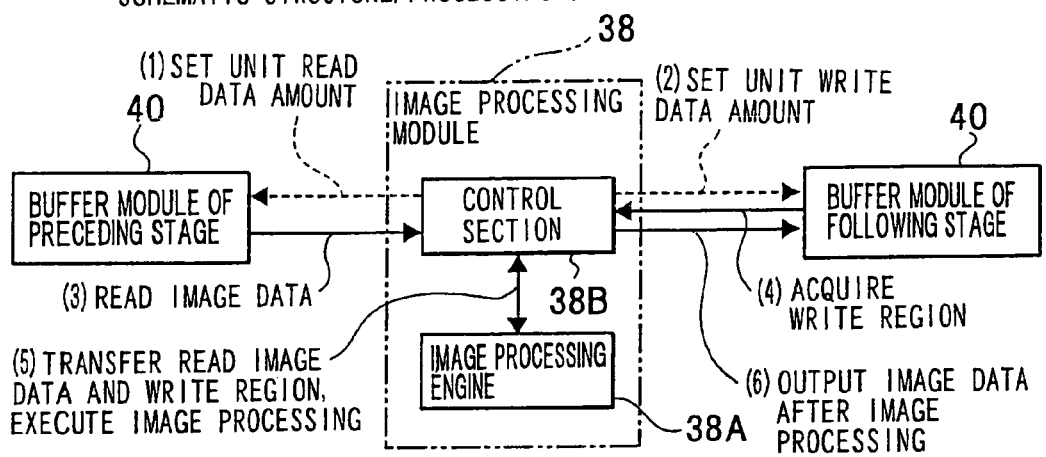
FIG. 15A is a block diagram showing the schematic structure of and processings executed at the image processing module.

As shown in FIG. 15A, each of the image processing modules 38 is structured from an image processing engine 38A and a control section 38B. The image processing engine 38A carries out the image processing on the image data, per a predetermined unit processing data amount. The control section 38B carries out input and output of image data with the modules at the preceding and the following stages of the image processing module 38, and controls the image processing engine 38A. The unit processing data amount at each of the image processing modules 38 is selected and set in advance in accordance with the type of the image processing which the image processing engine 38A carries out or the like, from among an arbitrary number of bytes such as one line of an image, plural lines of an image, one pixel of an image, one image (a whole image), or the like. For example, at the image processing modules 38 which carry out color converting processing and filtering processing, the unit processing data amount is one pixel. At the image processing module 38 which carries out enlargement/reduction processing, the unit processing data amount is one line of an image or plural lines of an image. At the image processing module 38 which carries out image rotating processing, the unit processing data amount is one whole image. At the image processing module 38 which carries out image compression/decompression processing, the unit processing data amount is N bytes which depends on the execution environment.

The image processing modules 38, at which the types of the image processings are the same but the contents of the executed image processings are different, also are registered in the module library 36. (In FIG. 1, these types of image processing modules are designated as "module 1" and "module 2".) For example, with regard to the image processing modules 38 which carry out enlargement/reduction processing, there are plural image processing modules 38 such as the image processing module 38 which carries out reduction processing which reduces inputted image data by 50% by thinning every other pixel, the image processing module 38 which carries out enlargement/reduction processing at an enlargement/reduction rate which is designated for inputted image data, and the like. Further, for example, with regard to the image processing modules 38 which carry out color converting processing, there are the image processing module 38 which converts an RGB color space into a CMY color space, the image processing module 38 which converts the opposite way, and the image processing module 38 which carries out another color space conversion such as an L*a*b* space or the like.

In order to input the needed amount of the image data for carrying out processing at the image processing engine 38, the control section 38B acquires image data in units of the unit reading data amount from the preceding module (e.g., the buffer module 40) of its own module (current module), and outputs the image data outputted from the image processing engine 38A to the following module (e.g., the buffer module 40) in units of the unit writing data.

If image processing involving an increase or decrease in the data amount such as compression or the like is not carried out at the image processing engine 38A, the unit writing data amount equals the unit processing data amount. Or, the control section 38B carries out the processing of outputting the results of image processing by the image processing engine 38A to the exterior of its own module (e.g., if the image processing engine 38A carries out image analyzing processing such as skew angle sensing processing or the like, the results of the image analyzing processing, such as the results of sensing the skew angle or the like, may be outputted instead of the image data). The image processing modules 38, at which the types and contents of the image processings which the image processing engines 38A execute are the same but the aforementioned unit processing data amount or unit reading data amount or unit writing data amount are different, also are registered in the module library 36. For example, although it was previously mentioned that the unit processing data amount at the image processing module 38 which carries out image rotating processing is one whole image, the image processing module 38, which carries out the same image rotating processing but whose unit processing data amount is one line of an image or plural lines of an image, may be included in the module library 36.

The program of each of the image processing modules 38 which are registered in the module library 36 is structured from a program which corresponds to the image processing engine 38A and a program which corresponds to the control section 38B. The program which corresponds to the control section 38B is made into a part. The program corresponding to the control section 38B is used in common for the image processing modules 38 whose unit reading data amounts and unit writing data amounts are the same among the individual image processing modules 38, regardless of the types and contents of the image processings executed at the image processing engines 38A (the same program is used as the program corresponding to the control sections 38B). In this way, the burden of development in developing the programs of the image processing modules 38 is reduced.

Among the image processing modules 38, there are modules, which the attributes of the inputted image are unknown, the unit reading data amount and the unit writing data amount are not fixed, and the attributes of the input image data are acquired, and the unit reading data amount and the unit writing data amount are fixed by carrying out arithmetic operation by substituting the acquired attributes into predetermined arithmetic operation formulas.

With respect to this type of image processing module 38, it suffices for the program corresponding to the control section 38B to be used in common at the image processing modules 38 at which the unit reading data amount and the unit writing data amount are derived by using the same arithmetic operation formula.

Further, the image processing program group 34 can be implemented in various types of devices as described above. Among the image processing program group 34, the numbers and types and the like of the image processing modules 38 which are registered in the module library 36 may of course be appropriately added, deleted, substituted, and the like, in accordance with the image processings which are required at the device into which the image processing program group 34 is implemented.

Figure 15B:
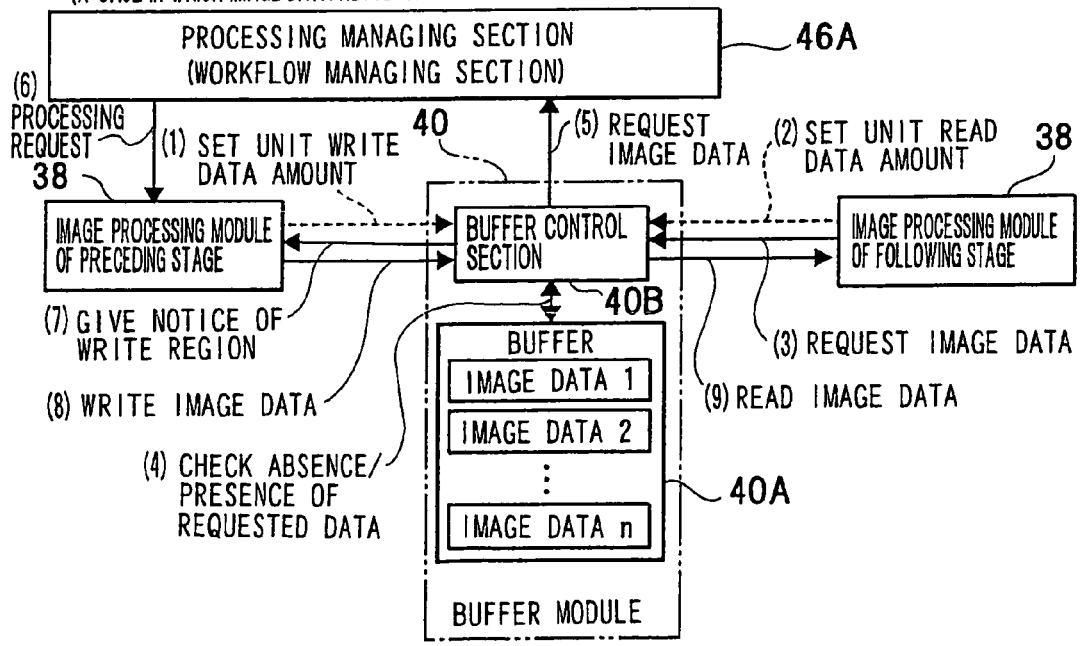
FIG. 15B is a block diagram showing the schematic structure of and processings executed at the buffer module.

As shown in FIG. 15B, each of the buffer modules 40 structuring the image processing section 50 is structured from a buffer 40A and a buffer control section 40B. The buffer 40A is structured by a memory region which is reserved through the operating system 30 from the memory 14 provided at the computer 10. The buffer control section 40B carries out input and output of image data with the modules at the preceding and the following stages of the buffer module 40, and management of the buffer 40A. The buffer control section 40B itself of each buffer module 40 also is a program which is executed by the CPU 12, and the program of the buffer control section 40B also is registered in the module library 36. (The program of the buffer control section 40B is designated as "buffer module" in FIG. 1.)

The processing constructing section 42 which constructs the image processing section 50 instructed by the application 32 is structured from plural types of module generating sections 44 as shown in FIG. 1. The plural types of module generating sections 44 correspond to image processings which differ from one another, and by being started-up by the application 32, carry out the processings of generating module groups from the image processing modules 38 and the buffer modules 40 which are for realizing the corresponding image processings.

FIG. 1 illustrates, as examples of the module generating sections 44, the module generating sections 44 which correspond to the types of image processings which are executed by the individual image processing modules 38 registered the module library 36. The image processings corresponding to the individual module generating sections 44 may be image processings which are realized by plural types of the image processing modules 38 (e.g., skew correcting processing which is formed from skew angle sensing processing and image rotating processing). In a case in which the needed image processing is a processing which combines plural types of image processings, the application 32 successively starts-up the module generating sections 44 corresponding to any of the plural types of image processings. In this way, the image processing section 50 which carries out the image processings which are needed, is constructed by the module generating sections 44 which are successively started-up by the application 32.

As shown in FIG. 1, the processing managing section 46 includes a workflow managing section 46A which controls the execution of the image processings at the image processing section 50, a resource managing section 46B which manages the use of the memory 14 and the resources of the computer 10, and an error managing section 46C which manages errors which arise at the image processing section 50. The image processing section 50 operates to carry out image processings in parallel while transferring image data to the following stages in units of a data amount which is smaller than one whole image (which is called block unit processing). Also, the section 50 operates such that, after the preceding image processing module 38 completes image processing on the image data of one whole image, the following image processing module 38 carries out image processing on the image data of one whole image (which is called whole image processing). As the programs of the workflow managing section 46A, there are a program for causing the image processing section 50 to carry out block unit processing, and a program for causing the image processing section 50 to carry out whole image processing.

Operation of the present embodiment will be described next. When the power source of the computer 10 is turned on, the resource managing section 46B starts-up, and the initializing processing is carried out by the resource managing section 46B as shown in FIG. 2A.

In the present embodiment, there are three types of managing methods as the methods of managing memory by the resource managing section 46B, and it is possible to select and set by which of these managing methods the memory management is to be carried out. The first is a first managing method which, each time there is a request from an individual module of the image processing section 50, reserves, from the memory 14 and through the operating system 30, a memory region to be allotted to the module which is the source of the request. The second is a second managing method which reserves a memory region of a given size in advance from the memory 14 and through the operating system 30, and when there is a request from an individual module, allots a partial region of the memory region which is reserved in advance, to the module which is the source of the request. The third is a third managing method which reserves a memory region of a given size in advance from the memory 14 and through the operating system 30, and when there is a request from an individual module, if the size of the requested memory region is less than a threshold value, allots a partial region of the memory region which is reserved in advance to the module which is the source of the request, and if the size of the requested memory region is greater than or equal to the threshold value, reserves, through the operating system 30, a memory region to be allotted to the module which is the source of the request. Note that the present invention is not limited to the same, and other memory managing methods may be used.

The managing method is selected as follows for example. The first managing method is suitable in particular in cases such as when it is used from an application which does not have memory limitations or the like and it is desired to suppress the increase in the program size due to complex memory management, or the like. Further, the second managing method is suitable in a case in which the memory amount which can be used by the entire application which carries out image processing in accordance with the present invention is limited, and there is the need to operate within this range. On the other hand, the third managing method is suitable in cases in which the processing time needed for reserving and freeing (releasing) the memory must be made to be high speed, because overhead may increase when using a memory reserving/freeing function of the operating system 30 in reserving and freeing minute memory regions.

Figure 2A:
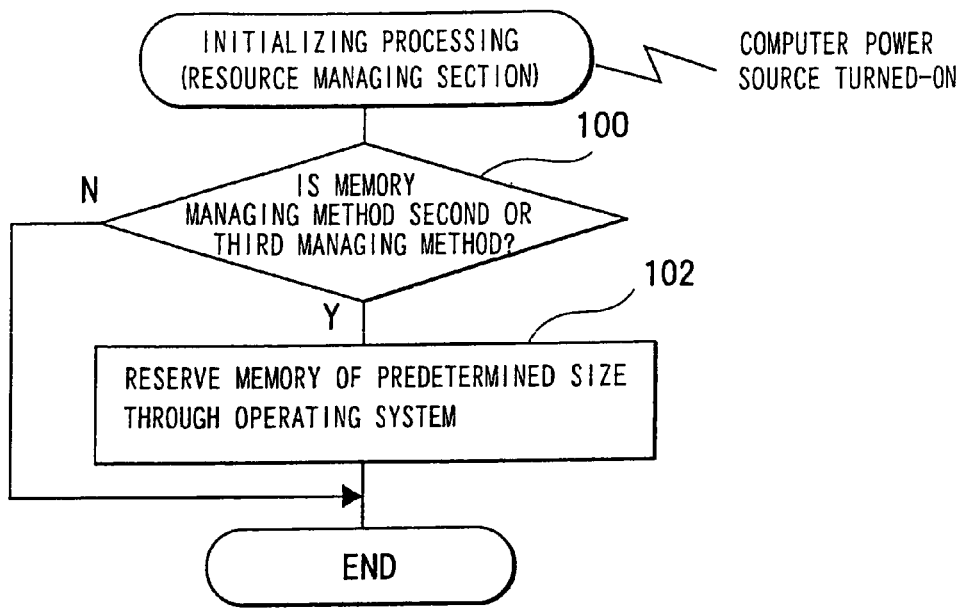
FIG. 2A is a flowchart showing the contents of initializing processing which is executed by a resource managing section.

In step 100 of the initializing processing shown in FIG. 2A, it is judged whether or not the memory managing method which is selected and set is the second managing method or the third managing method. The memory managing method may be selected and set at the time of implementing the image processing program group 34 into the computer 10. Or, the resource managing section 46B may acquire the system environment of the computer 10 (e.g., the size of the memory 14, or the type of the device in which the image processing program group 34 is implemented, or the like), and the memory managing method can be automatically selected and set on the basis of the acquired system environment. If the memory managing method is the first managing method, the aforementioned judgment is negative, and the initializing processing ends. However, if this judgment is affirmative, the routine moves on to step 102 where a memory region (continuous region) of a predetermined size is reserved through the operating system 30 from the memory 14 provided at the computer 10, and the routine ends. The aforementioned predetermined size as well may be selected and set in accordance with the system environment or the like.

Here, if the memory managing method is the first managing method, the memory region requested through the operating system 30 is reserved in response to a memory reserving request which is generated thereafter, and the memory region is freed through the operating system similarly in response to a memory freeing request. Since these processings are similar to those used in usual programs, explanation thereof is omitted.

If the memory managing method is the second managing method, in response to a memory reserving request which is generated thereafter, a memory region of a size corresponding to the request is searched for and reserved from the unused region whose state is "unused" among the memory region which was reserved in advance in previous step 102. The state of the reserved memory region is changed to "used", and the reserved memory region is transferred to the source of the request. For a memory freeing request, the memory region for which freeing is requested is incorporated into an unused region of the memory region which was reserved in advance, and processing is carried out to change the state of the incorporated memory region from "used" to "unused". The information expressing whether the states of memory regions are unused or used can be managed, for example, by a table or a list or the like.

Figure 2B:
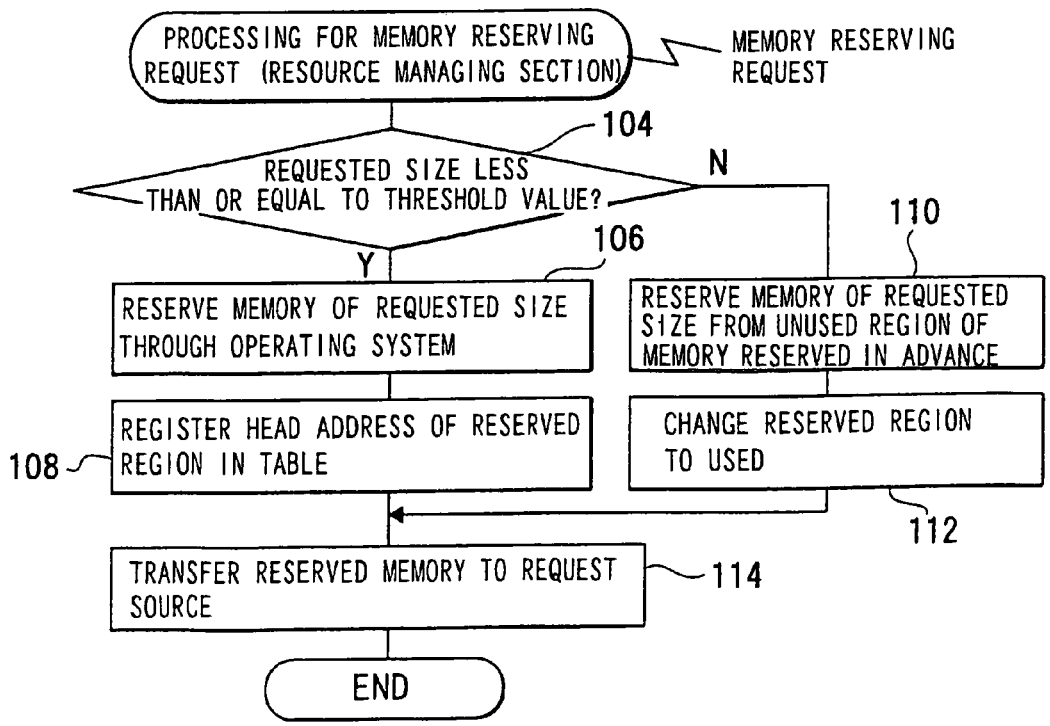
FIG. 2B is a flowchart showing the contents of processing for a memory reserving request in a third managing method, which is executed by the resource managing section.

Next, the third managing method will be described. When a memory reserving request is generated, the processing for a memory reserving request as shown in FIG. 2B is carried out by the resource managing section 46B. In the processing for a memory reserving request, in step 104, it is judged whether or not the requested size is less than or equal to a threshold value which is set in advance. If the requested size is not less than nor equal to the threshold value, in the same way as in the first managing method, in step 106, a memory region of the requested size is reserved through the operating system 30, and in step 108, the head address of the reserved memory region is registered in a table in the resource managing section 46B. Instead of a table, another means such as a list or an associative array or the like may be used. If it is judged in step 104 that the requested size is less than or equal to the threshold value, in the same way as in the second managing method, a memory region of the requested size is reserved (step 110) from the unused region of the memory region which was reserved in advance in previous step 102, and the state of the reserved region is changed to "used" (step 112). Then, in step 114, the reserved memory region is transferred to the source of the request.

Figure 2C:
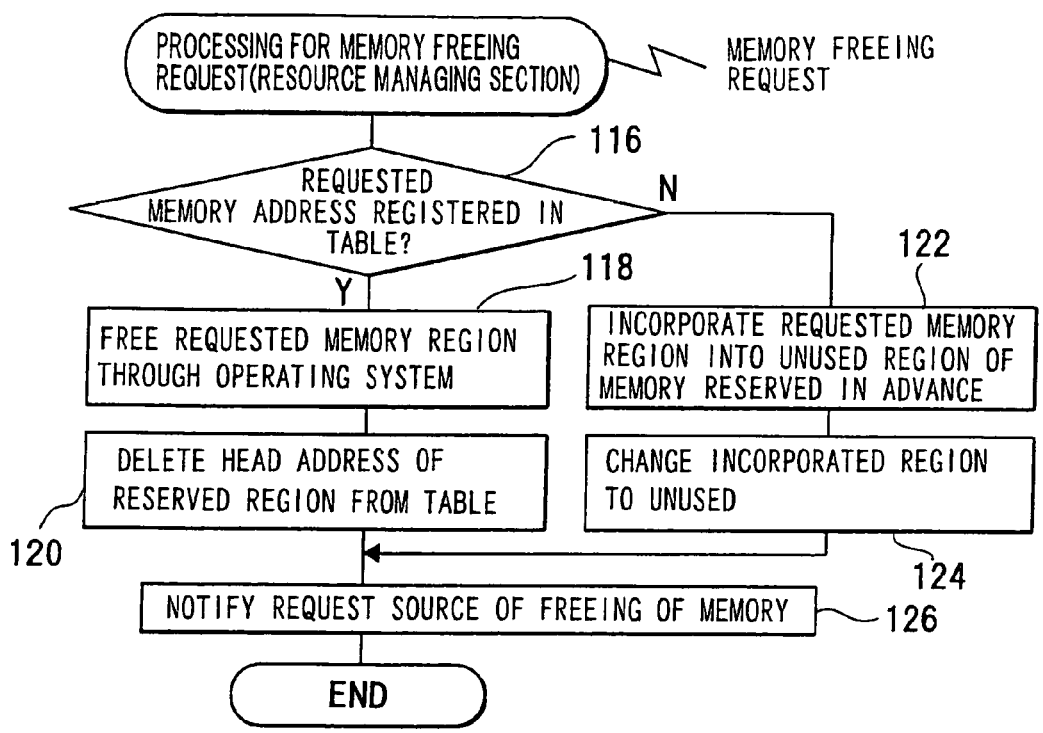
FIG. 2C is a flowchart showing the contents of processing for a memory freeing request in the third managing method, which is executed by the resource managing section.

Further, in the third managing method, when a memory freeing request is generated, the processing for a memory freeing request as shown in FIG. 2C is carried out by the resource managing section 46B. In the processing for a memory freeing request, in step 116, it is judged whether or not the head address of the memory region for which freeing is requested is registered in the aforementioned table. If the judgment in step 116 is affirmative, the memory region for which freeing is requested is a memory region reserved through the operating system 30. Therefore, in step 118, the memory region for which freeing is requested is freed through the operating system 30, and in next step 120, the head address of the memory region for which freeing is requested is deleted from the aforementioned table. Further, if the judgment in step 116 is negative, the memory region for which freeing is requested is a memory region reserved from the memory region which was reserved in advance in previous step 102. Accordingly, in step 122, the memory region for which freeing is requested is incorporated in the unused region of the memory region which was reserved in advance, and the state of the incorporated memory region is changed to "unused" in step 124. After these processings, in step 126, the source of the request is notified of the freeing of the requested memory region, and the processing for a memory freeing request ends.

Figure 2D:
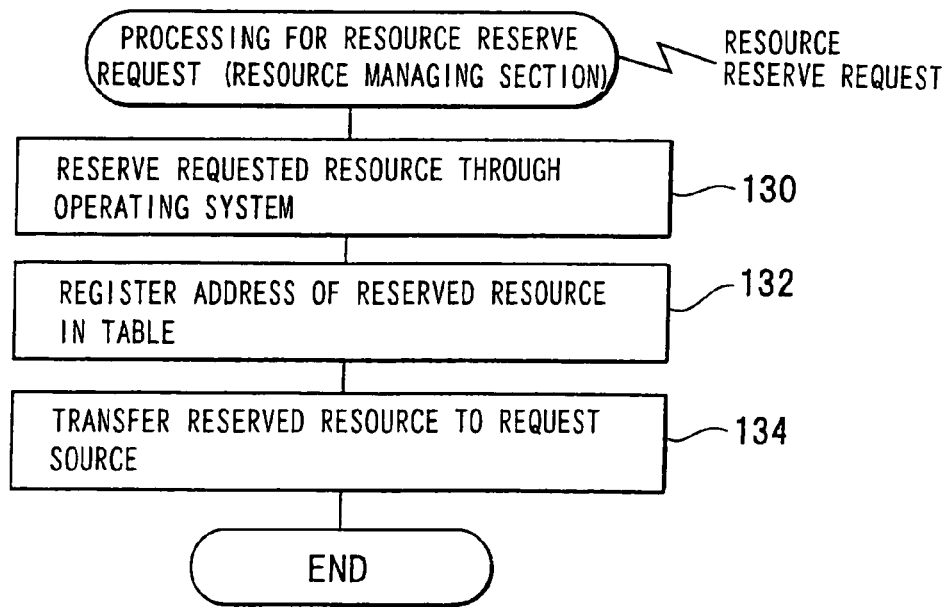
FIG. 2D is a flowchart showing the contents of processing for a resource reserving request, which is executed by the resource managing section.
Figure 2E:
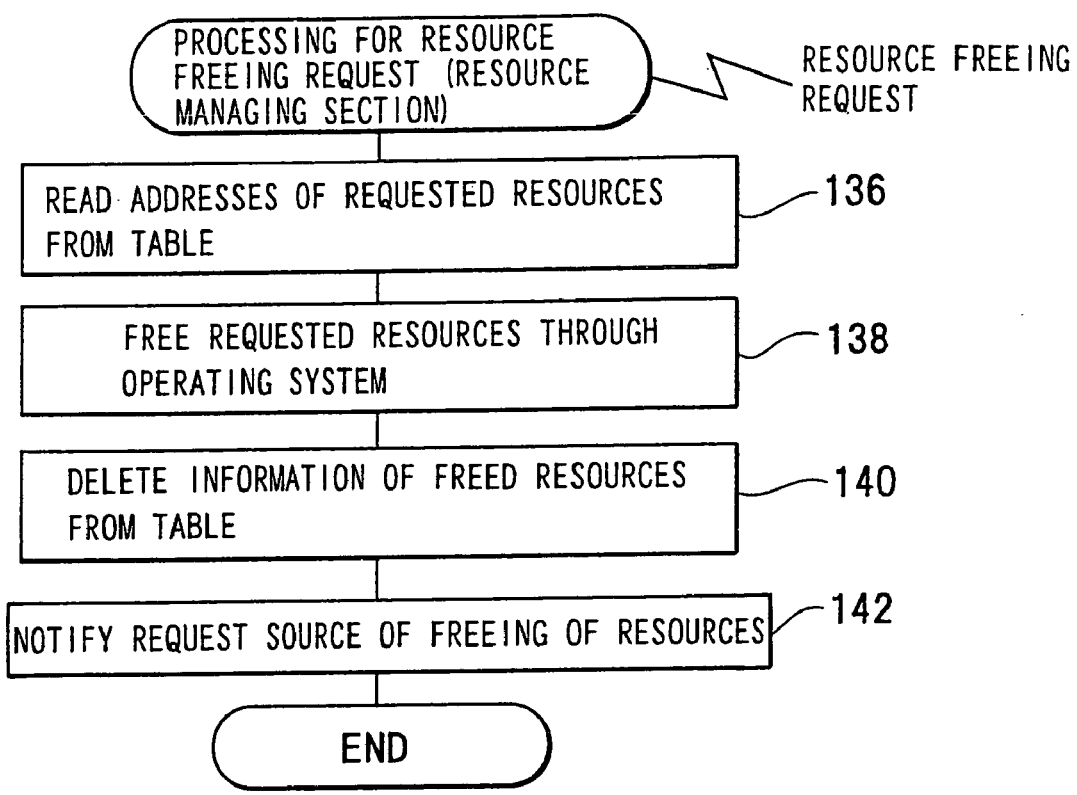
FIG. 2E is a flowchart showing the contents of processing for a resource freeing request, which is executed by the resource managing section.

Next, explanation will be given of a case in which reserving/freeing of a resource other than the memory (e.g., a specific file or the like) is requested of the resource managing section 46B. When a resource reserving request is inputted, the resource managing section 46B carries out the processing for a resource reserving request which is shown in FIG. 2D. In the processing for a resource reserving request, in step 130, the resource for which reserving is requested is reserved through the operating system 30. In next step 132, the address of the reserved resource is registered in a table in the resource managing section 46B in correspondence with information identifying the module which is the source of the request. In step 134, the reserved resource is transferred to the source of the request, and processing ends. Further, when a resource freeing request is inputted, the resource managing section 46B carries out the processing for a resource freeing request which is shown in FIG. 2E. In the processing for a resource freeing request, in step 136, the information (the addresses of the reserved resources), which is registered in the table in the resource managing section 46B in correspondence with the information identifying the module which is the source of the request, is read. In next step 138, all of the resources which are expressed by the read information are freed through the operating system 30. Further, in step 140, the table is updated such that the information corresponding to the freed resources is deleted from the table. In next step 142, the source of the request is notified of the freeing of the resources, and processing ends.

In this way, in reserving/freeing resources other than the memory, at the time of reserving, the reserved resource is registered in a table, and at the time of freeing, the resources which are registered in the table (the resources reserved in accordance with requests from the same requesting source) are all freed. Therefore, as compared with a method in which the resource to be freed is designated by a source of the resource freeing request, it is possible to free the resources certainly. In these memory and resource reserving/freeing processings, there are cases in which there are failures in processing from insufficient resources or the like. In such cases, a processing such as notifying the error managing section 46C or the like is needed. However, descriptions of such error processings will be omitted here in order to simplify explanation.

Figure 3:
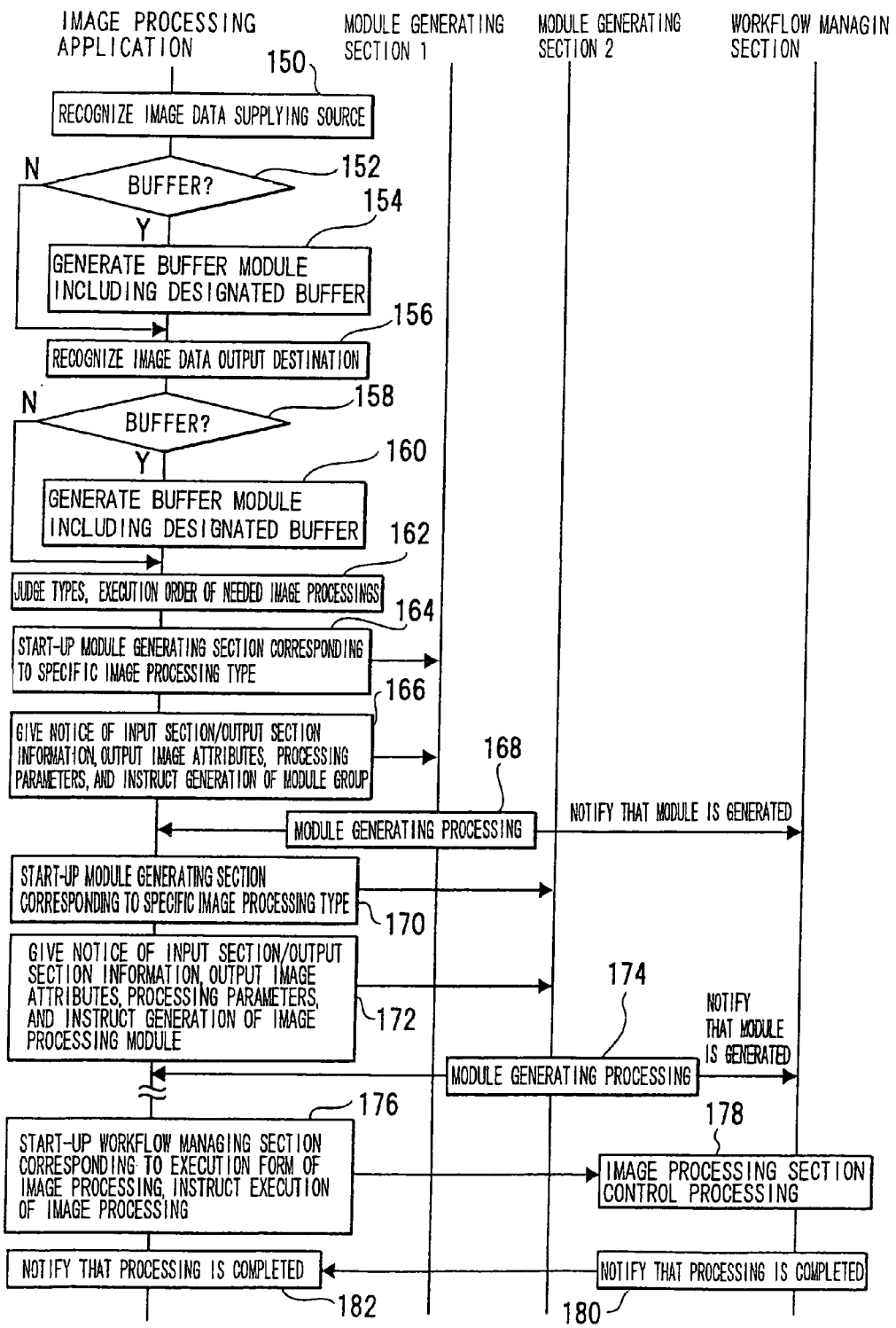
FIG. 3 is a sequence diagram for explaining processings by an application.

On the other hand, when a situation of implementing an image processing arises at a device which has the image processing program group 34, this situation is sensed by a specific application 32, and the processing shown in FIG. 3 is carried out by that application 32. There are some examples of the situation of implementing the image processing, which an image is read by an image reading section which serves as the image data supplying section 22, and the user instructs execution of a job which is to record the image as an image on a recording material by an image recording section serving as the image outputting section 24, or is to display the image as an image on a display section serving as the image outputting section 24, or which is to write the image data onto a recording medium by a writing device serving as the image outputting section 24, or which is to transmit the image data by a transmitting/receiving section serving as the image outputting section 24, or which is to store the image data in an image storage section serving as the image outputting section 24, or a case in which the user instructs execution of a job which carries out any of the aforementioned recording onto a recording material, displaying on a display section, writing to a recording medium, transmitting, and storing in an image storage section, on image data which is either received by a receiving section serving as the image data supplying section 22 or is stored in an image storage section serving as the image data supplying section 22. Further, the situations in which there is a need for image processing to be carried out are not limited to those described above, and may be, for example, a case in which the processing which is the object of execution is selected by the user in a state in which the names or the like of the processings which the applications 32 can execute are displayed in a list on the display 16 in accordance with an instruction from the user, or the like.

When the situation arises, some types of image processing must be carried out as described above. The application 32 first recognizes the type of the image data supplying section 22 which supplies the image data to be processed (refer to step 150 of FIG. 3). When the recognized type is a buffer region (a partial region of the memory 14) (i.e., in a case in which the judgment of step 152 in FIG. 3 is affirmative), the buffer module 40 which includes the buffer region designated as the image data supplying section 22 is generated (refer to step 154 of FIG. 3 as well). The new generation of a buffer module 40, which will be described later, is carried out by the buffer control section 40B. The buffer control section 40B is generated by generating a process, thread, or object which executes the program of the buffer control section 40B of the buffer module 40. The new generation is generated by generating a memory region which is used as the buffer 40A, being reserved by the generated buffer control module 40B. However, the generation of the buffer module 40 in step 154 is achieved by setting parameters which make (the buffer control section 40B) recognize the designated buffer region as the buffer 40A which has already been reserved, and carrying out processing of generating the buffer control section 40B. The buffer module 40 generated here functions as the image data supplying section 22.

Next, in the same way as described above, the application 32 recognizes the type of the image outputting section 24 which serves as the output destination of the image data on which the image processing is carried out (refer to step 156 of FIG. 3). If the recognized type is a buffer region (a partial region of the memory 14) (i.e., if the judgment in step 158 of FIG. 3 is affirmative), the buffer module 40 which includes the buffer region designated as the image outputting section 24 is generated in the same way as described above (refer to step 160 of FIG. 3). The buffer module 40 which is generated here functions as the image outputting section 24. Further, the application 32 recognizes the contents of the image processing to be executed, and divides the image processing to be executed into a combination of image processings of levels corresponding to the individual module generating sections 44, and judges the types of the image processings necessary in order to realize the image processing which is to be executed, and the order of execution of the individual image processings (refer to step 162 of FIG. 3). This judgment can be realized by, for example, the aforementioned types of image processings and orders of execution of individual image processings being registered in advance as information in correspondence with the types of jobs whose execution can be instructed by the user, and the application 32 reading-out the information corresponding to the type of job for which execution has been instructed.

Then, on the basis of the types of image processings and order of execution which were judged in the above, the application 32 starts-up the module generating section 44 which corresponds to the image processing which is first in the order of execution (i.e., generates a process, thread, or object which executes the program of the module generating section 44). Thereafter (refer to step 164 of FIG. 3), the application 32 notifies the started-up module generating section 44 of, as information needed for generating a module group by that module generating section 44, input module identification information for identifying the input module which inputs image data to that module group, output module information for identifying the output module to which that module group outputs image data, input image attribute information expressing the attributes of the input image data which is inputted to that module group, and parameters of the image processing which is to be executed, and instructs generation of the corresponding module group (refer to step 166 of FIG. 3).

For the module group which is first in the order of execution, the image data supplying section 22 is the aforementioned input module. For the module groups which are second or thereafter in the order of execution, the final module (usually the buffer module 40) of the module group of the preceding stage is the input module. Further, at the module group which is last in the order of execution, the image output section 24 is the aforementioned output module, and therefore, the image outputting section 24 is designated as the output module. At the other module groups, the output module is not fixed. Therefore, when designation by the application 32 is not carried out and it is needed, the output module is generated and set by the module generating section 44. Further, the input image attributes and the parameters of the image processings may, for example, be registered in advance as information in correspondence with the types of jobs for which execution can be designated by the user, and the application 32 can recognize them by reading-out the information corresponding to the type of the job for which execution is instructed. Or, the input image attributes and the parameters of the image processings may be designated by the user.

Figure 4A:
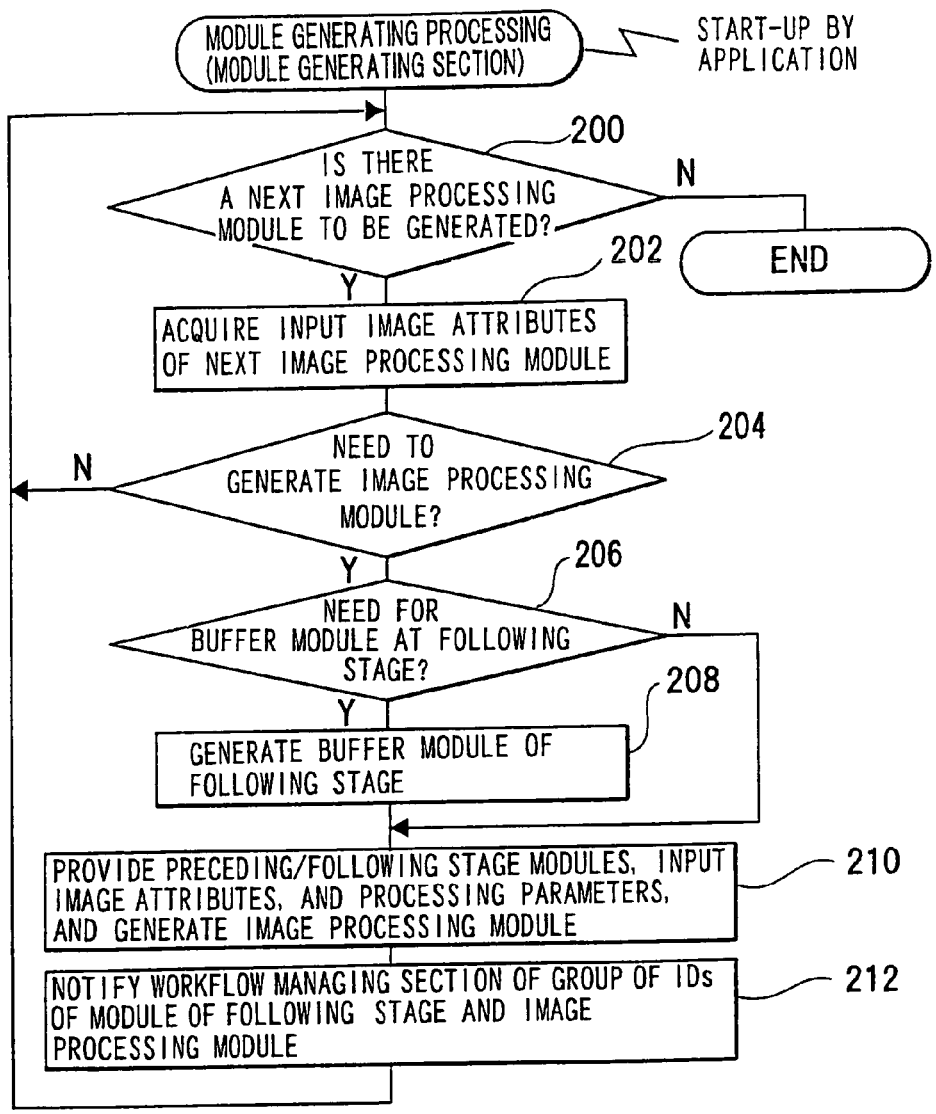
FIG. 4A is a flowchart showing the contents of module generating processing executed by a module generating section.

On the other hand, when the module generating section 44 is started-up by the application 32, the module generating section 44 carries out the module generating processing shown in FIG. 4A (refer to step 168 in FIG. 3). In the module generating processing, in step 200, it is judged whether or not there is an image processing module 38 to be generated next at the module generating section 44. If the judgment is negative, the module generating processing ends. If there is an image processing module 38 to be generated, in step 202, the module generating section 44 acquires input image attribute information which expresses the attributes of the input image data. In next step 204, the module generating section 44 judges whether or not, also in view of the attributes of the input image data expressed by the information acquired in step 202, it is necessary to generate the image processing module 38 which was judged in previous step 200 as to be generated.

Specifically, for example, the module generating section 44 corresponding to the module generating processing which is being executed, is a module generating section which generates a module group for carrying out color converting processing. The CMY color space is designated from the application 32 as the color space of the output image data by the parameters of the image processing. When the input image data is RGB color space data based on the input image attribute information acquired in step 202, there is needed to generate the image processing module 38 to convert RGB to CMY color space as the image processing module 38 which carries out the color space processing. However, when the input image data is CMY color space, the attributes of the input image data and the attributes of the output image data match with respect to the color space, and therefore, it can be judged that there is no need to generate the image processing module 38 which carries out color space converting processing. If it is judged to be unnecessary, the routine returns to step 200.

When the buffer module 40 exists at the preceding stage of the image processing module 38 which is generated, the processing of acquiring the attributes of the input image data can be realized by acquiring the attributes of output image data from the image processing module 38. Here, the image processing module 38 is the further preceding image processing module 38 from the image processing module 38 which writes image data to that buffer module 40.

In next step 206, it is judged whether or not the buffer module 40 is needed at the following stage of the image processing module 38 which is generated. This judgment is negative in a case in which the following stage of the image processing module 38 is an output module (the image outputting section 24) (e.g., refer to the image processing module 38 of the final stage in the image processing sections 50 shown in FIGS. 5A through 5C), or in a case in which the image processing module is a module which carries out image processing such as analysis or the like on the image data and outputs the results thereof to another image processing module 38 (e.g., the image processing module 38 which carries out skew angle sensing processing in the image processing section 50 shown in FIG. 5B), and the routine moves on to step 210 without generating the buffer module 40. In cases other than those described above, the judgment is affirmative, and the routine moves on to step 208 where, by starting-up the buffer control section 40B (i.e., generating a process, thread or object which executes the program of the buffer control section 40B), the buffer module 40 which is connected at the following stage of the image processing module 38 is generated. When the buffer control section 40B is started-up by the module generating section 44 (or the aforementioned application 32), the buffer control processing shown in FIG. 6 is carried out. This buffer control processing will be described later.

In next step 210, the image processing module 38 is generated from the information of the module of the preceding and following stages (e.g., both of modules are the buffer module 40), the processing parameters, and the attributes of the input image data.

When it is judged in step 206 that the following buffer module 40 is not needed, information of the following buffer module 40 is not provided for the image processing module 38. Also, processing parameters are not provided in a case in which the processing contents are fixed and special image processing parameters are not required, such as in reduction processing of 50% for example.

In the module generating processing (step 210), the image processing module 38 is selected from among plural candidate modules which are registered in the module library 36 to matche the attributes of the input image data acquired in step 202 and the processing parameters which are to be executed at the image processing module 38. For example, when the module generating section 44 generates a module group carrying out color converting processing, and the CMY color space is designated from the application 32 as the color space of the output image data based on the processing parameters. Also, in this case, when the input image data is data of the RGB color space, the image processing module 38 converts RGB to CMY color space. As described above, the suitable image processing module 38 for the processing is selected from among the plural types of image processing modules 38 which are registered in the module library 36 and which carry out various types of color space processings.

Further, if the image processing module is the image processing module 38 which carries out enlargement/reduction processing and the designated enlargement/reduction ratio is other than 50%, the image processing module 38, which carries out enlargement/reduction processing at an enlargement/reduction rate which is designated for the inputted image data, is selected. If the designated enlargement/reduction rate is 50%, the image processing module 38, which carries out enlargement/reduction processing specialized at an enlargement/reduction rate of 50%, i.e., which carries out reduction processing which reduces the inputted image data by 50% by thinning every other pixel, is selected. The selection of the image processing module 38 is not limited to the above. For example, plural image processing modules 38, whose unit processing data amounts in the image processings by the image processing engines 38A are different, may be registered in the module library 36, and the image processing module 38 of the appropriate unit processing data amount may be selected in accordance with the operational environment, such as the size of the memory region which can be allotted to the image processing section 50 or the like (e.g., the smaller the aforementioned size, the image processing module 38 of an increasingly smaller unit processing data amount is selected, or the like). Or, the image processing module 38 may be selected by the application 32 or the user.

Figure 4B:
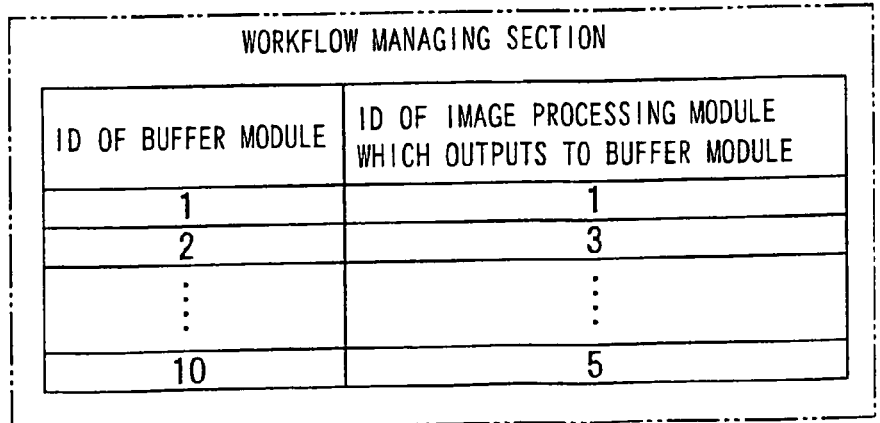
FIG. 4B is a schematic diagram explaining a table of a workflow managing section.

In next step 212, the workflow managing section 46A is notified of a group which is the ID of the following buffer module 40 and the ID of the generated image processing module 38. These IDs are information which can uniquely distinguish these individual modules. For example, the ID may be a number which is applied in the order of generating the individual modules, or may be the address on the memory of the object of the buffer module 40 or the image processing module 38, or the like. The information which is notified to the workflow managing section 46A is held within the workflow managing section 46A, for example, in the form of a table as shown in FIG. 4B, or in the form of a list, or in the form of an associative array or the like, and is used in later processings. Explanation will continue hereinafter with the information being held in the form of a table.

In the case of an image processing module 38 which does not have the following buffer module 40 as described previously, processing is carried out in accordance with the following method for example. In a case in which the image processing module 38 which is generated is one of the final point of a pipeline or the final point of a directed acyclic graph such as the image processing module 38 which carries out the output processing in FIG. 5A, that image processing module 38 is returned, as the output of the module generating section 44, to the application 32 which is the call-up source.

Figure 5B:
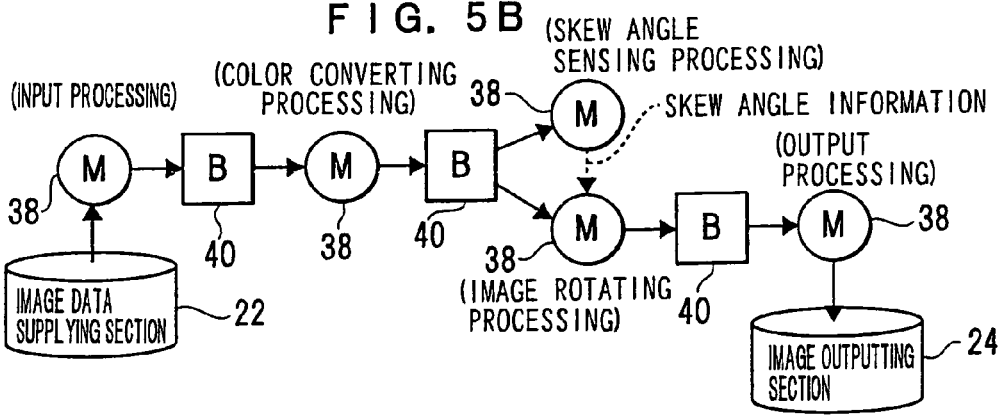
Figure 5C:
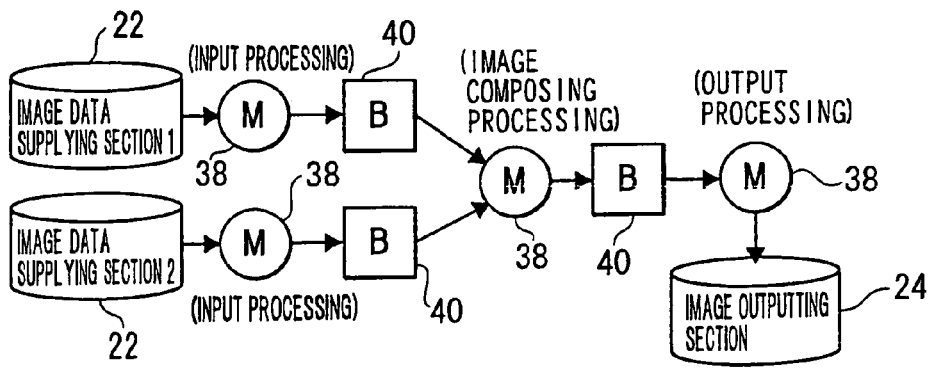
Figure 6:
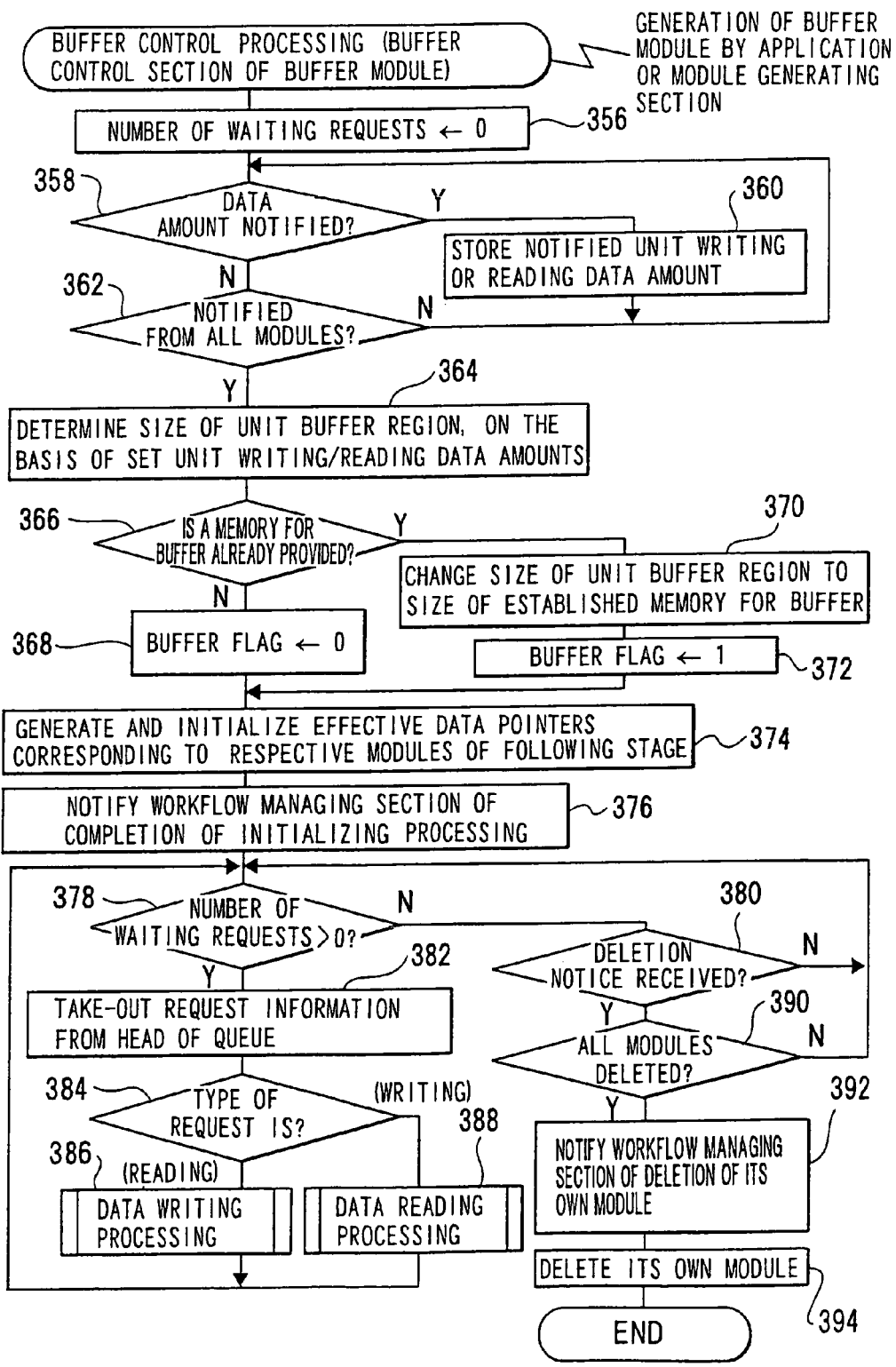
FIG. 6 is a flowchart showing the contents of buffer control processing executed by a buffer control section of a buffer module.

Further, in a case, such as the image processing module 38 which carries out skew angle sensing processing in FIG. 5B, in which the results of the image processing at the generated image processing module 38 are used at another image processing module (the image processing module 38 which carries out image rotating processing in FIG. 5B), the module generating section 44 instructs repeated execution of processing until the processings with respect to that image processing module 38 are completed, and acquires the results of processing.

When the processing of step 212 ends, control returns to step 200, and the module generating section 44 judges whether or not there is an image processing module to be generated next. The individual module generating sections 44 generate module groups which carry out corresponding, given image processings. Therefore, this judgment can be realized by registering in advance and reading-out information relating to what kind of image processing modules are to be generated in what kind of connected relationship for each of the individual module generating sections 44, or by describing this in a program which operates the module generating sections 44. For example, in a case in which the module generating section 44 generates a module group which carries out image processings which are realized by plural types of image processing modules 38 (e.g., skew correction processing which is realized by the image processing module 38 which carries out skew angle sensing processing and the image processing module 38 which carries out image rotating processing), a module group containing two or more image processing modules 38 is generated.

When the application 32 is notified of the completion of generation of the module group as described above from the module generating section 44 which was instructed to generate the module group, the application 32 judges, on the basis of the results of the judgment in step 162 of FIG. 3, whether or not, in order to realize the image processings which are required, there is the need to also generate module groups which carry out other image processings. If the image processings which require combine plural types of image processings, the application 32 starts-up the other module generating sections 44 corresponding to the individual image processings, and successively carries out the processing of giving notice of the information needed for module group generation (refer to steps 170 and 172 of FIG. 3 as well). Then, due to the above-described module generating processing (FIG. 4) being successively carried out (refer to step 174 in FIG. 3 as well) by the module generating sections 44 which are successively started-up, the image processing section 50 which carries out the required image processings is constructed as shown as examples in FIGS. 5A through 5C.

According to the present embodiment, when the frequency of execution of a specific image processing is high or the like, even after the image processing section 50 which carries out the specific image processing is generated, the application 32 does not instruct the plural module generating sections 44, which are for generating the image processing section 50 which carries out the specific image processing, to end processing, and retains them as processes, threads or objects. Each time the need to carry out the specific image processing arises, by successively instructing the module generating sections 44, which remain as processes, threads or objects, to generate module groups, the image processing section 50 which carries out the specific image processing can be re-generated. In this way, each time the need arises to carry out the specific image processing, there is no need for processings for respectively starting-up the corresponding module generating sections 44, and the time required to re-generate the image processing section 50 which carries out the specific image processing can be shortened.

Figure 12:
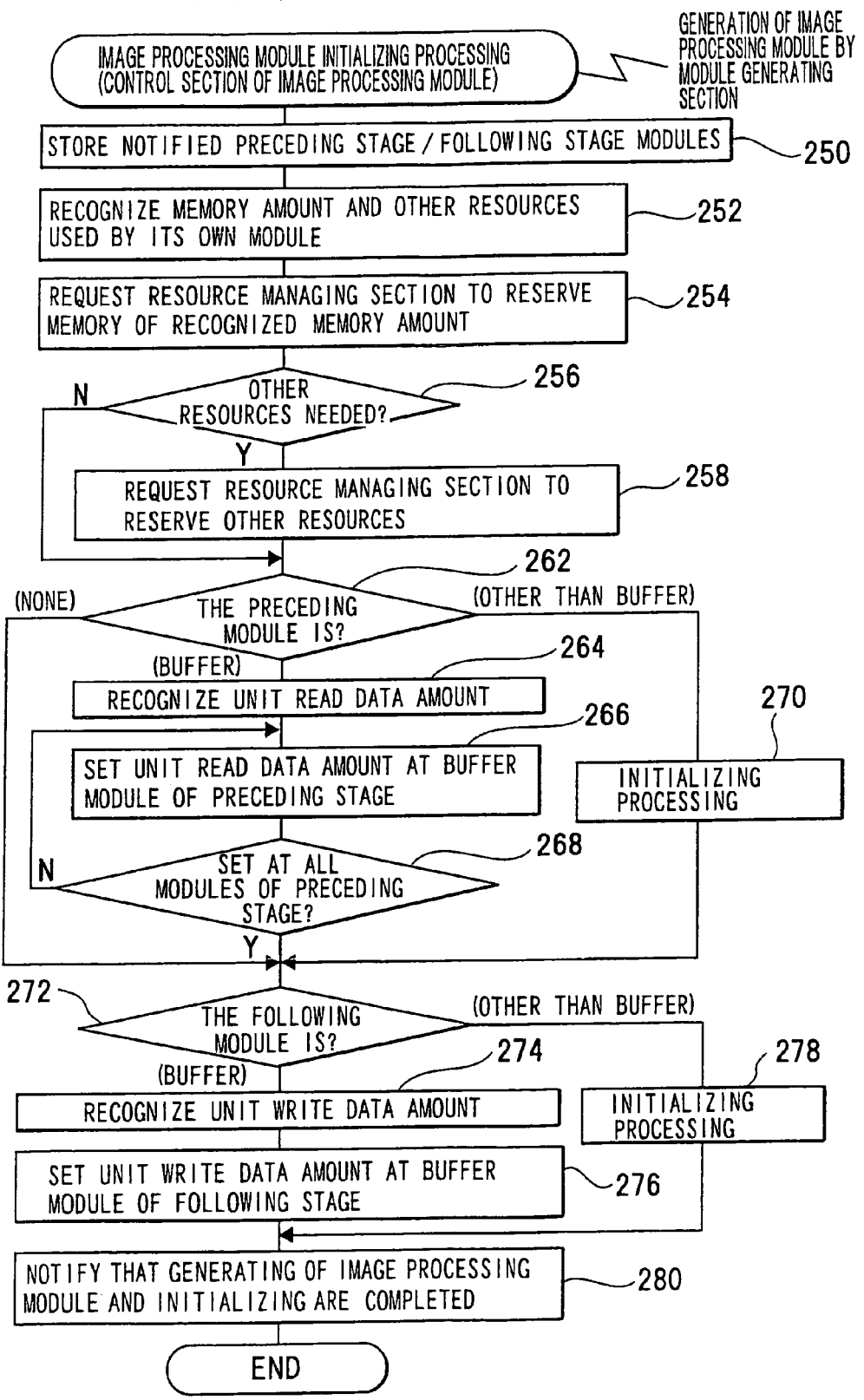
FIG. 12 is a flowchart showing the contents of image processing module initializing processing executed by a control section of an image processing module.

When started-up by the module generating section 44, the control section 38B (see FIG. 15A) of the image processing module 38 carries out the image processing module initializing processing shown in FIG. 12. In this image processing module initializing processing, first, in step 250, due to the module generating section 44 carrying out the processing of step 210 of the module generating processing (FIG. 4), the control section 38B stores the information of the modules of the preceding and the following stages of its own module which is provided from the module generating section 44. Further, in next step 252, on the basis of the type and the contents and the like of the image processing which the image processing engine 38A of its own module carries out, the control section 38B recognizes the size of the memory that its own module uses and other resources that its own module uses. The memory which its own module uses is mainly the memory needed in order for the image processing engine 38A to carry out image processing. However, in a case in which the preceding module is the image data supplying section 22 or in a case in which the following module is the image outputting section 24, a memory for a buffer, which is for temporarily storing image data at times of transmitting and receiving image data to and from the modules of the preceding and the following stages, may be needed. Further, in a case in which information of a table or the like is included in the processing parameters, a memory region for holding this may be needed. Then, in step 254, the resource managing section 46B is informed of the size which was recognized in step 252, and the resource managing section 46B is requested to reserve a memory region of the notified size.

In the resource managing processing shown in FIG. 2 (the resource managing section 46B), when reserving of a memory region is requested from the image processing module 38 or the buffer module 40, in a case in which the memory managing method which is selected and set is the first managing method for example, a memory region (continuous region) of the size notified from the module, which is the source of the memory reserving request, is reserved from the memory 14 through the operating system 30. Then, by notifying the module, which is the source of the memory reserving request, of the head address of the reserved memory region, the reserved memory region is transferred to the module which is the source of the memory reserving request. Further, if the memory managing method is the second managing method, a memory region (continuous region) of the notified size is reserved from the unused region of the memory region which is reserved in advance, and the reserved memory region is changed to "used", and the reserved memory region is transferred to the source of the memory reserving request. Moreover, if the memory managing method which is selected and set is the third managing method, by executing the above-described processing for a memory reserving request (see FIG. 2B), reserving and transfer of a memory region of the notified size are carried out.

In the image processing module initializing processing shown in FIG. 12 (the control section 38B of the image processing module 38), when the needed memory region is reserved via the resource managing section 46B through the above-described processings, in next step 256, it is judged, on the basis of the processings results of previous step 252, whether or not (the image processing engine 38A of) its own module needs resources other than the memory. If the judgment is negative, the routine moves on to step 262 without any processing being carried out. If the judgment is affirmative, the routine moves on to step 258 where the resource managing section 46B is notified of the type and the like of the resources other than the memory which its own module needs, and is requested to reserve the notified other resources, and reserves them.

Next, in step 262, the control section 38B judges the preceding module of its own module, and if no preceding module of its own module exists, the routine moves on to step 272. If the preceding module is other than the buffer module 40, e.g., is the image data supplying section 22 or a specific file or the like, initializing processing thereof is carried out in step 270 as needed, and the routine proceeds to step 272. Further, in a case in which a preceding module of its own module exists and that preceding module is the buffer module 40, the routine proceeds from step 262 to step 264, and the data amount of the image data acquired by reading-out image data one time from the preceding buffer module 40 (i.e., the unit reading data amount) is recognized. If the number of preceding buffer modules 40 of its own module is one, there is one unit reading data amount. However, in a case such as when there are plural preceding buffer modules 40 and the image processing engine 38A carries out image processing by using image data which is acquired from each of the plural buffer modules 40, such as in the case of the image processing module 38 which carries out image composing processing in the image processing section 50 shown in FIG. 5C for example, the unit reading data amount corresponding to each preceding buffer module 40 is determined in accordance with the type and the contents of the image processings which the image processing engine 38A of its own module carries out, and the number of the preceding buffer modules 40, and the like.

In step 266, by notifying a single one of the preceding buffer modules 40 of the unit reading data amount which was recognized in step 264, the unit reading data amount for that buffer module 40 is set (refer to (1) of FIG. 15A as well). In next step 268, it is judged whether or not unit reading data amounts are set at all of the preceding buffer modules 40 of its own module. If the number of preceding buffer modules 40 of its own module is one, this judgment is affirmative, and the routine moves on to step 272. If the number of preceding buffer modules 40 is a plural number, the judgment in step 268 is negative, and the routine returns to step 266, and steps 266 and 268 are repeated until the judgment of step 268 becomes affirmative. In this way, unit reading data amounts are respectively set for all of the preceding buffer modules 40.

In step 272, the control section 38B judges the following module of its own module. In a case in which the following module of its own module is other than the buffer module 40, e.g., is the image outputting section 24 or a specific file or the like, initializing processing thereof is carried out in step 278 as needed, and the routine moves on to step 280. For example, if the following module is the image outputting section 24 which is formed from any of an image recording section, a display section, a writing section, or a transmitting section, processings are carried out with respect to the image outputting section 24 as the aforementioned initializing processing. Here, the processings notify that image data is outputted in units of a data amount which corresponds to the unit writing data amount. Further, if the following module is the buffer module 40, the data amount of the writing image data of one time (i.e., the unit writing data amount) is recognized in step 274. That unit writing data amount is set at the following buffer module in step 276 (refer also to (2) of FIG. 15A), and thereafter, the routine moves on to step 280. In step 280, the module generating section 44 is notified that this image processing module initializing processing is completed, and the image processing module initializing processing ends.

On the other hand, when the buffer control section 40B (see FIG. 15B) of the individual buffer module 40 structuring the image processing section 50 is started-up by the module generating section 44 or the application 32, the buffer control section 40B carries out the buffer control processing shown in FIG. 6. In this buffer control processing, when the buffer control section 40B is started-up by the module generating section 44 or the application 32 and generation of the buffer module 40 is instructed, a number of waiting requests is initialized to 0 in step 356. In next step 358, it is judged whether or not a unit writing data amount is notified from the preceding image processing module 38 of its own module or a unit reading data amount has been notified from the following image processing module 38 of its own module. If the judgment is negative, the routine moves on to step 362 where it is judged whether or not unit writing data amounts or unit reading data amounts have been notified from all of the image processing modules 38 connected to its own module. If the judgment is negative, the routine returns to step 358, and steps 358 and 362 are repeated until the judgment of step 358 or step 362 is affirmative.

When the unit writing data amount or the unit reading data amount is notified from the specific image processing module 38 connected to its own module, the judgment in step 358 is affirmative, and the routine moves on to step 360 where the notified unit writing data amount or unit reading data amount is stored. Thereafter, the routine returns to step 358. Accordingly, each time the unit writing data amount or the unit reading data amount is notified from the individual image processing modules 38 due to the processing of step 266 or step 276 of the image processing module initializing processing (FIG. 12) being carried out by the control sections 38B of the individual image processing modules 38 connected to its own module, the notified unit writing data amount or unit reading data amount is stored, and the notified unit writing data amount or unit reading data amount is set at the buffer module 40 (refer to (1) and (2) of FIG. 15B as well).

When the image writing data amounts or the image reading data amounts from all of the image processing modules 38 connected to its own module are notified, and the notified unit writing data amounts and unit reading data amounts are respectively set, the judgment in step 362 is affirmative, and the routine proceeds to step 364. In step 364, on the basis of the unit writing data amounts and the unit reading data amounts respectively set by the individual image processing modules 38 connected to its own module, the buffer control section 40B determines the size of a unit buffer region which is the managing unit of the buffer 40A of its own module, and stores the determined size of the unit buffer region. The maximum value of the unit writing data amount and the unit reading data amount which are set at its own module is suitable for the size of the unit buffer region. However, the unit writing data amount may be set as the size of the unit buffer region, or the unit reading data amount (in a case in which plural image processing modules 38 are connected at the following stage of its own module, the maximum value of the unit reading data amounts which are respectively set by the individual image processing modules 38) may be set as the size of the unit buffer region. Or, the least common multiple of the unit data writing amount and the (maximum value of the) unit reading data amount(s) may be set. Or, if this least common multiple is less than a predetermined value, the least common multiple may be set, or if the least common multiple is greater than or equal to the predetermined value, another value (e.g., any of the aforementioned maximum value of the unit writing data amount and unit reading data amount(s), or the unit writing data amount, or the (maximum value of the) unit reading data amount(s)) may be set as the size of the unit buffer region.

In next step 366, the buffer control section 40B judges whether or not a memory region, which is used as the buffer 40A of its own module, is already provided. If its own module is generated by the module generating section 44, this judgment is negative, and a buffer flag is set to 0 in step 368. Thereafter, the routine moves on to step 374. Further, if its own module is generated by the application 32 and is a buffer module 40 which functions as the image data supplying section 22 or the image outputting section 24, the memory region which is used as the buffer 40A of its own module already exists. Therefore, the judgment of step 366 is affirmative, and the routine moves on to step 370. In step 370, the size of the unit buffer region which was determined in previous step 364 is changed to the size of the established memory region which is used as the buffer 40A of its own module. Further, in next step 372, the buffer flag is set to 1, and thereafter, the routine proceeds to step 374.

In step 374, the buffer control section 40B generates respective effective data pointers which correspond to the individual following image processing modules 38 of its own module, and initializes the respective generated effective data pointers. The effective data pointers indicate the head position (the next reading start position) and the end position respectively of the image data (effective data) which is not read by the corresponding following image processing module 38, among the image data which is written in the buffer 40A of its own module by the preceding image processing module. In the initializing processing of step 374, specific information is usually set, which the specific information means that effective data does not exist. If its own module is generated by the application 32 and is the buffer module 40 which functions as the image data supplying section 22, there are cases in which image data which is the object of image processing is already written in the memory region which is used as the buffer 40A of its own module. In such cases, the head position and the end position of that image data are respectively set as the effective data pointers which correspond to the individual following image processing modules 38.

As described above, the initializing processing at the buffer module 40 is completed, in next step 376, the workflow managing section 46A is notified of the completion of the initialization processing. Further, in step 378, it is judged whether or not a value which is greater than 0 is set as the number of waiting requests for which initial setting was carried out in previous step 356. If the judgment is negative, the routine moves on to step 380. It is judged whether or not a deletion notice which gives notice that the processing of deleting that image processing module 38 is to be carried out, has been received from the image processing module 38 connected at the preceding or following stages of its own module. If this judgment as well is negative, the routine returns to step 378, and step 378 and step 380 are repeated until either of the judgments is affirmative.

On the other hand, when the constructing of the image processing section 50 which carries out the needed image processings is completed due to the above-described module generating processing (see FIG. 4) by the module generating sections 44, the application 32 judges whether the forms of execution of the image processings are block unit processing or whole image processing. Then, by starting-up processes, threads, or objects which execute the programs of the workflow managing section 46A corresponding to the judged forms of execution, the application 32 instructs the workflow managing section 46A to execute the image processings by the image processing section 50 (refer also to step 176 of FIG. 3).

Different programs are started-up in accordance with the forms of execution of the image processings. The workflow managing section 46A of the processing managing section 46 carries out the block unit control processing shown in FIG. 16 when the form of execution of an image processing is block unit processing. Also, the 46A carries out the whole image control processing shown in FIG. 17 when the form of execution of an image processing is whole image processing. The block unit processing and the whole image control processing respectively correspond to the image processing section control processing shown in step 178 of FIG. 3. In the block unit processing or the whole image control processing, due to the workflow managing section 46A inputting a processing request to a predetermined image processing module 38 among the image processing modules 38 structuring the image processing section 50, image processing by the image processing section 50 is carried out in a block unit or a whole image form of execution.

Hereinafter, before the overall operation of the image processing section 50 is described, the processing after the completion of the initialization processing carried out by the buffer control sections 40B of the individual buffer modules 40, and the image processing module control processing carried out by the control sections 38B of the individual image processing modules 38, will be described in that order.

Figure 7:
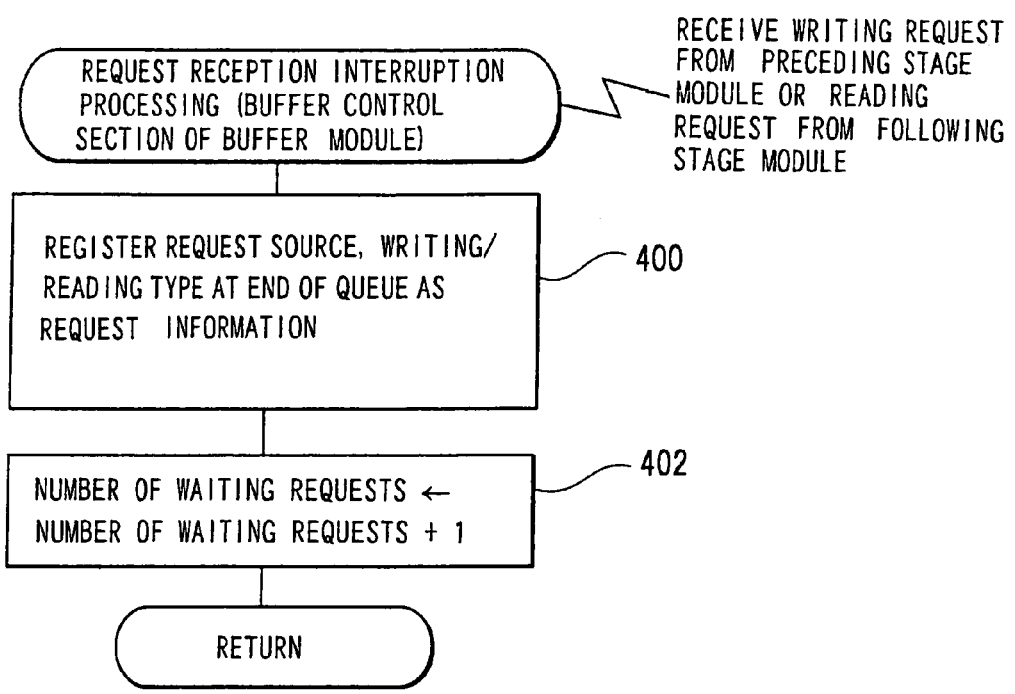
FIG. 7 is a flowchart showing the contents of request reception interruption processing executed by the buffer control section of the buffer module.

In the present embodiment, in a case in which the image processing module 38 writes image data to the following buffer module 40, a writing request is inputted from the image processing module 38 to the buffer module 40. In a case in which the image processing module 38 reads image data from the preceding buffer module 40, a reading request is inputted from the image processing module 38 to the buffer module 40. Therefore, when a writing request is inputted from the preceding image processing module 38 of its own module, or when a data request is inputted from the following image processing module 38 of its own module, the buffer control section 40B of the buffer module 40 carries out the request reception interruption processing shown in FIG. 7 due to an interruption arising. Note that, hereinafter, description which is premised on the occurrence of an interruption is given, but processing may start due to the calling-up of a method or function, as in a usual program. In this case, a structure may be used in which processing is carried out for each request, and requests are not queued in a queue as in the following description.

In the request reception interruption processing, first, in step 400, request source identifying information which identifies the request source which inputted the writing request or the data request to its own module, and request type information which expresses the type of the request (write or read), are registered at the end of the queue as request information. These queues are formed respectively on the memories which are allotted to the individual buffer modules 40. Further, in next step 402, the number of waiting requests is increased by one, and the request reception interruption processing ends. Due to this request reception interruption processing, each time a writing request or a reading request is inputted to a specific buffer module 40 from the image processing module of the preceding or the following stages of the specific buffer module 40, the request information corresponding to the inputted writing request or reading request is successively registered in the queue corresponding to the specific buffer module 40, and the number of waiting requests is increased one-by-one.

Figure 8:
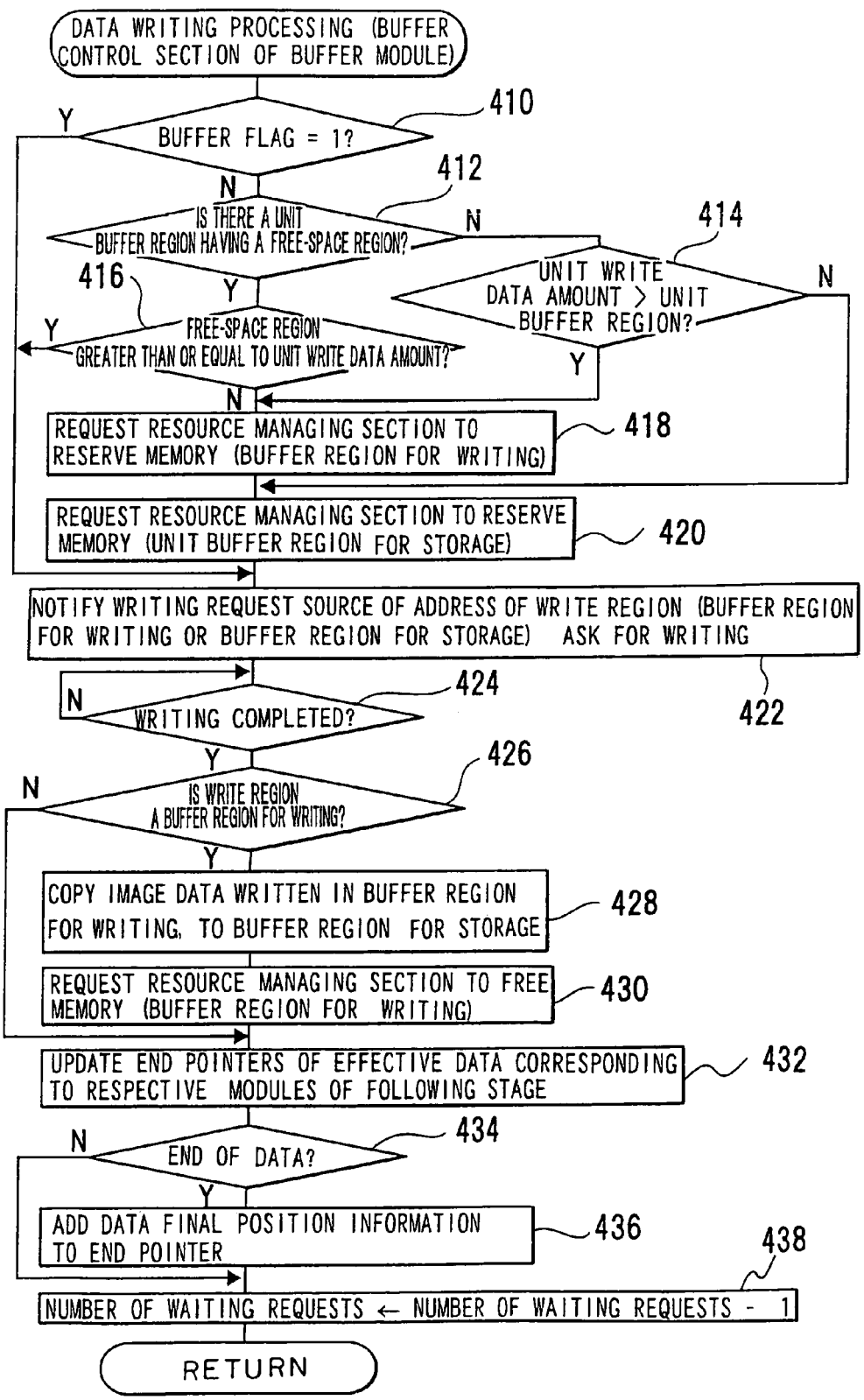
FIG. 8 is a flowchart showing the contents of data writing processing executed by the buffer control section of the buffer module.

When the number of waiting requests becomes a value which is greater than or equal to 1 due to the above-described request reception interruption processing being executed, the judgment of step 378 of the buffer control processing (FIG. 6) is affirmative, and the routine moves on to step 382 where the request information is taken-out from the head of the queue. In next step 384, on the basis of the request type information which is included in the request information taken-out in step 382, the type (writing or reading) of the request corresponding to the taken-out request information is judged, and the routine splits in accordance with the results of this judgment. If the type of request is a writing request, the routine moves on from step 384 to step 386, and the data writing processing shown in FIG. 8 is carried out.

In the data writing processing, first, in step 410, it is judged whether or not 1 is set for the buffer flag, i.e., whether or not its own module (current module) is the buffer module 40 generated by the application 32. If this judgment is affirmative, because the memory region used as the buffer 40A is already reserved, the routine moves on to step 422 without any processing being carried out. If the judgment in step 410 is negative, i.e., if its own module is the buffer module 40 generated by the module generating section 44, the routine proceeds to step 412. In step 412, it is judged whether or not there exists, among the unit buffer regions structuring the buffer 40A of its own module, a unit buffer region having a free-space region (a unit buffer region in which image data is not written to the end thereof).

At the buffer region 40 which is generated by the module generating section 44, a memory region (unit buffer region) used as the buffer 40A is not reserved initially, and a unit buffer region is reserved as a unit each time a shortage of memory regions arises. Therefore, when a writing request is first inputted to the buffer module 40, a memory region (unit buffer region) which is used as the buffer 40A does not exist, and this judgment will be negative. Further, also after a unit buffer region which is used as the buffer 40A is reserved through processings which will be described later, the aforementioned judgment will be negative in a case in which that unit buffer region just becomes full as the image data is written to that unit buffer region.

If the judgment in step 412 is negative, the routine moves on to step 414. In step 414, the image processing module 38 which is the source of the writing request is recognized on the basis of the request source identification information included in the request information taken-out from the queue, and the unit writing data amount set by the image processing module 38 which is the source of the writing request is recognized, and thereafter, it is judged whether or not the recognized unit writing data amount is greater than the size of the unit buffer region determined in previous step 364 (FIG. 6). In cases of employing the maximum value of the unit writing data amount and the unit reading data amount set at its own module, or employing the unit writing data amount set at its own module, this judgment will be always negative, and the routine moves on to step 420. In step 420, the resource managing section 46B is notified of the size of the memory region which is to be reserved (the size of the unit buffer region), and the resource managing section 46B is requested to reserve a memory region (a unit buffer region used in storing image data) which is used as the buffer 40A of its own module. In this way, due to the processings of previously-described step 104 through step 114 (see FIG. 2B) being carried out by the resource managing section 46B, the unit buffer region is reserved.

Further, in a case in which there exists, among the unit buffer regions structuring the buffer 40A of its own module, a unit buffer region having a free-space region, the judgment in step 412 is affirmative, and the routine proceeds to step 416. In step 416, in the same way as in above-described step 414, the unit writing data amount set by the image processing module 38 which is the source of the writing request is recognized, and thereafter, it is judged whether or not the size of the free-space region in the unit buffer region having a free-space region is greater than or equal to the recognized unit writing data amount. If the judgment is affirmative, there is no need to newly reserve a unit buffer region which is used as the buffer 40A of its own module, and therefore, the routine moves on to step 422 without any processing being carried out.

If the size of the unit buffer region is an integer multiple of the unit writing data amount, each time a writing request is inputted from the preceding image processing module 38 of its own module, either the judgments of steps 412, 414 are both negative or the judgments of steps 412, 416 are both affirmative as described above, and only the unit buffer region which is used as the buffer 40A is reserved as needed.

On the other hand, in a case in which the size of the unit buffer region is not an integer multiple of the unit writing data amount, by repeating the writing of the image data of the unit writing data amount to the buffer 40A (the unit buffer region), a state arises in which the size of the free-space region at the unit buffer region having a free-space region is smaller than the unit writing data amount (the judgment of step 416 is negative), as also shown in FIG. 9A as an example. Further, in the present embodiment, it is also possible to employ the unit reading data amount set at its own module (or the maximum value thereof) as the size of the unit buffer region. However, if the size thereof is smaller than the unit writing data amount (i.e., if the judgment in step 414 is affirmative), the aforementioned state always arises when a writing request is inputted.

As described above, in a case in which the size of the free-space region in the unit buffer region having a free-space region is smaller than the unit writing data amount, the region in which the image data of the unit writing data amount is written extends over plural unit buffer regions. However, in the present embodiment, because the memory region which is used as the buffer 40A is reserved in units of the unit buffer region, it is not possible to ensure that unit buffer regions which are reserved at different times will be regions which are continuous on the actual memory (the memory 14). Therefore, in a case in which the region in which the image data is written extends over plural unit buffer regions, i.e., in a case in which the judgment in step 416 is negative or the judgment in step 414 is affirmative, the routine moves on to step 418. In step 418, the resource managing section 46B is notified of the unit writing data amount as the size of the memory region which is to be reserved, and the resource managing section 48B is requested to reserve a memory region to be used for writing (a buffer region for writing: refer to FIG. 9B). Then, when the buffer region for writing is reserved, in next step 420, reserving of the unit buffer region which is used as the buffer 40A is carried out.

In step 422, if the size of the free-space region in the unit buffer region having a free-space region is greater than or equal to the unit writing data amount, that free-space region is made to be the write region. On the other hand, if the size of the free-space region in the unit buffer region having a free-space region is smaller than the unit writing data amount, the buffer region for writing which is newly reserved is made to be the write region, and the image processing module 38 which is the source of the writing request is notified of the head address of that write region, and is asked to write the image data which is the object of writing, in order from the notified head address. In this way, the image processing module 38 which is the source of the writing request writes the image data to the write region whose head address has been notified (the unit buffer region or the buffer region for writing) (see FIG. 9B). As described above, if the region in which the image data is written extends over plural unit buffer regions, the buffer region for writing is reserved separately. Accordingly, regardless of whether or not the region in which the image data is written extends over plural unit buffer regions, the notification of the write region to the image processing module 38 which is the source of the writing request is achieved merely by giving notice of the head address thereof as described above, and the interface with the image processing module 38 will be simple.

In next step 424, it is judged whether or not the writing of the image data to the write region by the preceding image processing module 38 is completed, and step 424 is repeated until the judgment is affirmative. When notice of the completion of writing is given from the preceding image processing module 38, the judgment of step 424 is affirmative, and the routine moves on to step 426. In step 426, it is judged whether or not the write region in the above-described writing processing is the buffer region for writing which was reserved in previous step 416. If this judgment is negative, the routine proceeds to step 432 without any processing being carried out. If the judgment of step 426 is affirmative, the routine proceeds to step 428. In step 428, as shown as an example in FIG. 9C, the image data written to the buffer region for writing is copied in a state of being divided between the unit buffer region having a free-space region and the new unit buffer region reserved in previous step 422. Further, in step 430, the resource managing section 46B is notified of the head address of the memory region which was reserved as the buffer region for writing in previous step 418, and the resource managing section 46B is requested to free that memory region.

Here, explanation is given of an embodiment in which the buffer region for writing is reserved when needed, and is freed right away when it is no longer needed. However, in a case in which the size of the unit buffer region for storage is not an integer multiple of the unit writing data amount, the buffer region for writing is absolutely necessary. Therefore, a structure may be used in which it is reserved at the time of initialization and freed at the time when the buffer module 40 is deleted.

When freeing of the memory region is requested from the image processing module 38 or the buffer module 40, the resource managing section 46B carries out the processing of freeing memory corresponding to the memory managing method which is selected and set. For example, if the memory managing method is the third managing method, the processing for a memory freeing request of FIG. 2C is carried out, and the freeing of the memory region is carried out.

In the data writing processing (FIG. 8), the routine moves on to step 432 when the judgment in step 426 is negative, or when notification of the completion of freeing is given from the resource managing section 46B after freeing of the memory is requested in step 430. In step 432, among the effective data pointers corresponding to the individual following image processing modules 38 of its own module, the pointers expressing the end positions of the effective data are respectively updated (refer to FIG. 9C). The updating of the pointer is achieved by moving the end position of the effective data which is indicated by the pointer, rearward by an amount corresponding to the unit writing data amount. In a case in which the image data which is written this time by the preceding image processing module 38 of its own module is data corresponding to the end of the image data which is the object of processing, when the writing processing by the preceding image processing module 38 is completed, an entire processing ended notice, which expresses that the image data which is the object of processing has ended, is given, and the size of the written image data is inputted from the preceding image processing module 38.

Therefore, in a case in which an entire processing ended notice is inputted from the preceding image processing module 38 when writing processing is completed, pointer updating is carried out by moving the end position of the effective data rearward by an amount corresponding to the size which is notified simultaneously.

In next step 434, on the basis of whether or not the entire processing ended notice is inputted at the time of completion of writing processing, it is judged whether or not writing of the image data which is the object of processing to the buffer 40A is completed. If the judgment is negative, the routine moves on to step 438 without any processing being carried out. However, if the judgment is affirmative, the routine proceeds to step 436 where data final position information, which expresses that this is the end of the image data which is the object of processing, is added to the pointer updated in step 432 (the pointer showing the end position of the effective data, among the effective pointers corresponding to the individual following image processing modules 38 of its own module). Thereafter, the routine proceeds to step 438. Then, in step 438, the number of waiting requests is reduced by 1, the data writing processing ends, and the routine returns to step 378 of the buffer control processing (FIG. 6).

Figure 10:
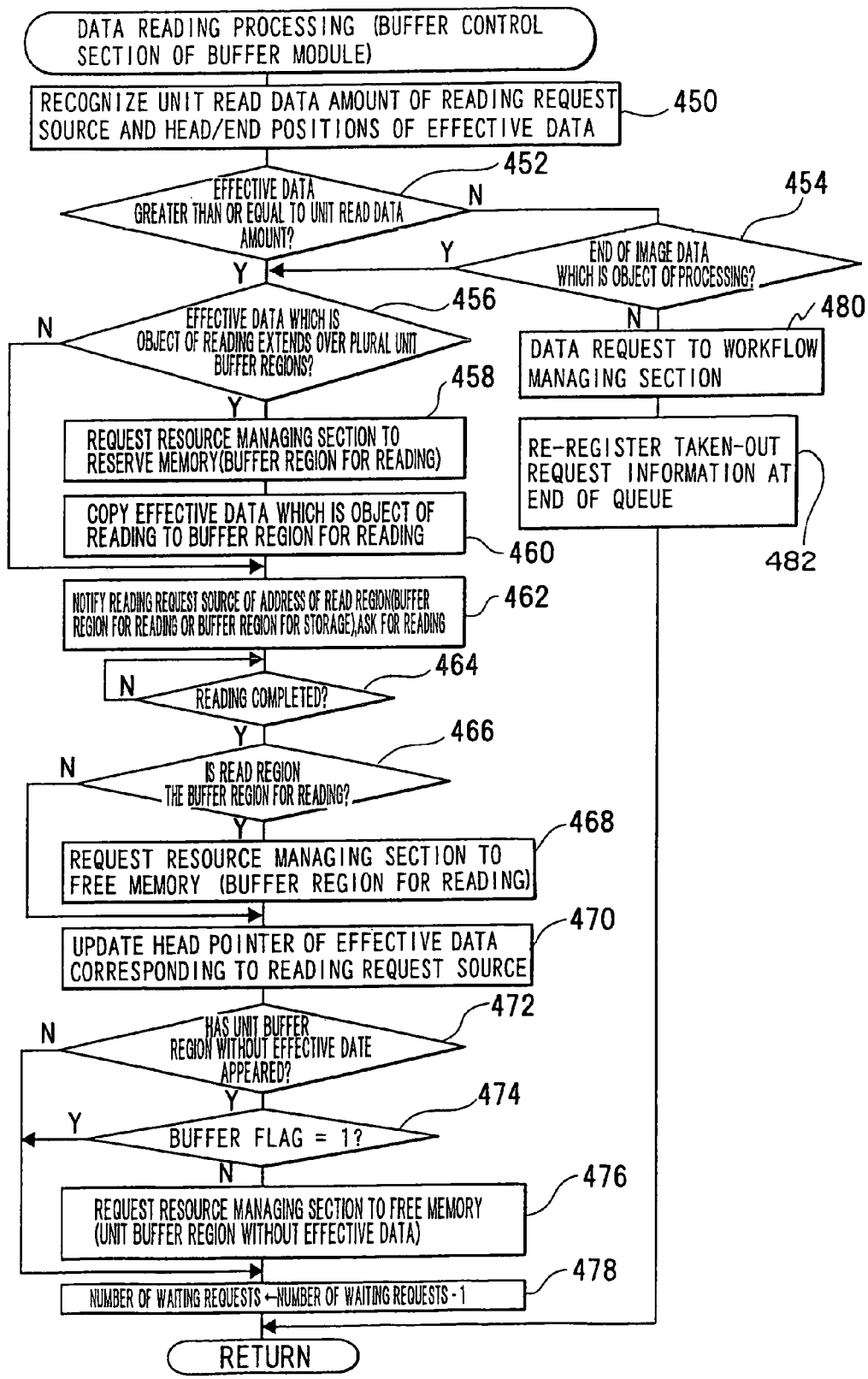
FIG. 10 is a flowchart showing the contents of data reading processing executed by the buffer control section of the buffer module.

In the buffer control processing (FIG. 6), in a case in which the type of the request corresponding to the request information which was taken-out in step 382 is reading, the routine moves on from step 384 to step 388, and the data reading processing shown in FIG. 10 is carried out. In the data reading processing, first, in step 450, on the basis of the request source identification information included in the request information taken-out from the queue, the image processing module 38 which is the source of the reading request is recognized, and the unit reading data amount set by the image processing module 38 which is the source of the reading request is recognized. Based on the effective data pointers corresponding to the image processing module 38 which is the source of the reading request, the head position and the end position on the buffer 40A of the effective data corresponding to the image processing module 38 which is the source of the reading request are recognized.

In next step 452, based on the head position and the end position of the effective data which were recognized in step 450, it is judged whether or not the effective data corresponding to the image processing module 38 which is the source of the reading request (the image data which can be read by the image processing module 38 which is the source of the reading request) is greater than or equal to the unit reading data amount.

If this judgment is negative, the routine moves on to step 454 where it is judged whether or not the end of the effective data is the end of the image data which is the object of processing, which the effective data is stored in the buffer 40A and which can be read by the image processing module 38 which is the source of the reading request.

The judgment in step 452 or step 454 is affirmative and the routine proceeds to step 456 in cases. One example of the cases is that the effective data corresponding to the image processing module 38 which is the source of the reading request is stored in the buffer 40A in an amount greater than or equal to the unit reading data amount. Another example of the cases is that although the effective data which is stored in the buffer 40A and corresponds to the image processing module 38 which is the source of the reading request is less than the unit reading data amount, the end of this effective data is the end of the image data which is the object of processing. In step 456, on the basis of the head position of the effective data which was recognized in previous step 450, the unit buffer region is recognized, which the unit buffer region stores the image data of the head portion of the effective data. Further, by judging whether or not the data amount of the effective data stored in the recognized unit buffer region is greater than or equal to the unit reading data amount recognized in step 450, it is judged whether or not the effective data which is the object of reading this time extends over plural unit buffer regions.

Figure 11:
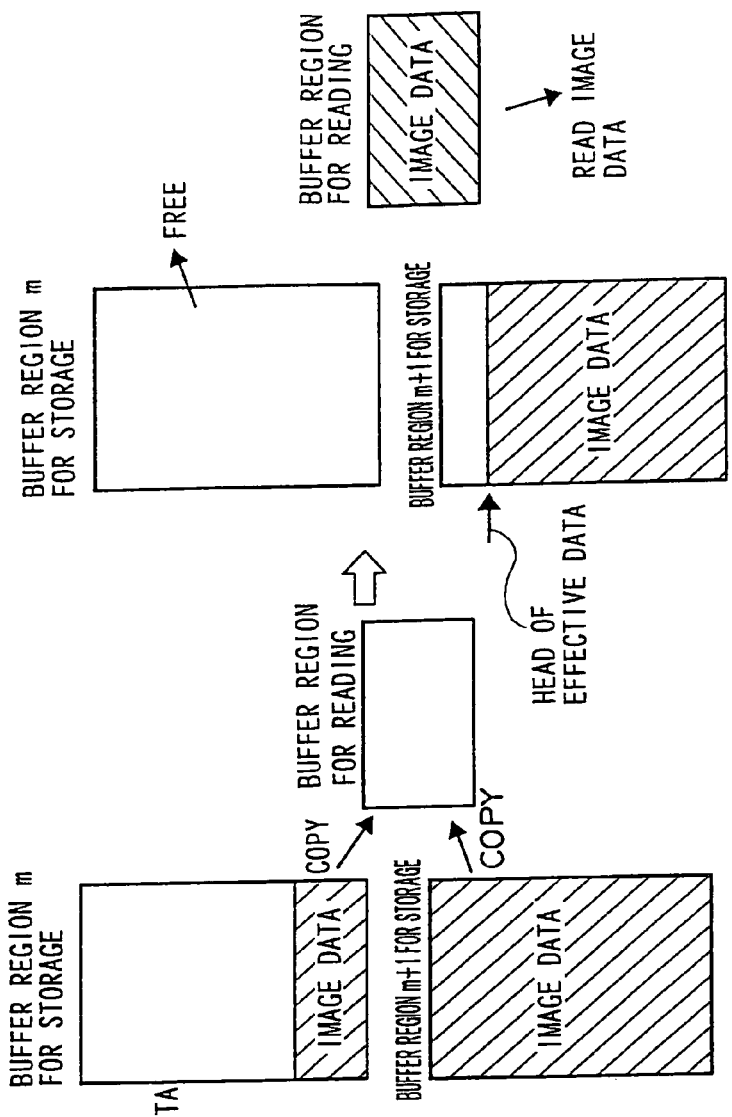
FIGS. 11A to 11C are schematic diagrams explaining processings in a case in which image data which is the object of reading extends over plural unit buffer regions for storage.

If the judgment of step 456 is negative, the routine proceeds to step 462 without any processing being carried out. Here, as shown in FIG. 11A for example, cases, in which the data amount of the effective data stored in the unit buffer region which stores the image data of the head portion of the effective data is less than the unit reading data amount and the effective data which is the object of reading this time extends over plural unit buffer regions, are not limited to the effective data which is the object of reading this time being stored in regions which are continuous on the actual memory (the memory 14). Therefore, if the judgment in step 456 is affirmative, the routine moves on to step 460 where the resource managing section 46B is notified of the unit reading data amount corresponding to the image processing module 38 which is the source of the reading request, as the size of the memory region which is to be reserved, and the resource managing section 46B is requested to reserve a memory region which is used in reading (buffer region for reading: see FIG. 11B). When the buffer region for reading is reserved, in next step 460, the effective data, which is the object of reading and which is stored over plural unit buffer regions, is copied to the buffer region for reading which was reserved in step 458 (refer to FIG. 11B as well).

In step 462, if the effective data which is the object of reading is stored in a single unit buffer region, the region, which is storing the effective data which is the object of reading, among that unit buffer region is made to be the read region. On the other hand, if the effective data which is the object of reading is stored over plural unit buffer regions, the buffer region for reading is used as the read region, and the image processing module 38 which is the source of the reading request is notified of the head address of that read region, and is asked to read the image data in order from the notified head address. In this way, the image processing module 38 which is the source of the reading request carries out reading of the image data from the read region whose head address was notified (the unit buffer region or the buffer region for reading) (see FIG. 11C as well). In a case in which the effective data to be the object of reading is data corresponding to the end of the image data to be the object of processing (i.e., in a case in which the end position of the effective data which is the object of reading coincides with the end position of the effective data which is indicated by the effective data pointer corresponding to the image processing module 38 which is the source of the reading request, and data final position information is added to that pointer), the image processing module 38 which is the source of the reading request is also notified of the size of the effective data which is the object of reading and of the fact that this is the end of the image data which is the object of processing.

As described above, in a case in which the effective data to be the object of reading is stored so as to extend over plural unit buffer regions, the effective data to be the object of reading is copied to the buffer region for reading which is reserved separately. Therefore, regardless of whether or not the effective data which is the object of reading is stored over plural unit buffer regions, the notification of the read region to the image processing module 38 which is the source of the reading request is achieved merely by giving notice of the head address thereof as described above, and the interface with the image processing module 38 can be simple. In a case in which its own module is the buffer module 40 generated by the application 32, the memory region used as the buffer 40A (the aggregate of the unit buffer regions) is a continuous region. Accordingly, the following is possible: before carrying out the judgment of step 456, it is judged whether or not the buffer flag is 1, and if the judgment is affirmative, the routine moves on to step 462 regardless of whether or not the effective data which is the object of reading is stored over plural unit buffer regions.

In next step 464, it is judged whether or not reading of the image data from the read region by the image reading module 38 which is the source of the reading request is completed, and step 464 is repeated until this judgment is affirmative. When the completion of reading is notified from the image processing module 38 which is the source of the reading request, the judgment of step 464 is affirmative, and the routine proceeds to step 466 where it is judged whether or not the read region in the above-described reading processing is the buffer region for reading which was reserved in previous step 458. If the judgment is negative, the routine proceeds to step 470 without any processing being carried out. If the judgment in step 466 is affirmative, the routine moves on to step 468 where the resource managing section 46B is notified of the size and the head address of the memory region which was reserved as the buffer region for reading in previous step 458, and the resource managing section 46B is requested to free that memory region. For the buffer region for reading as well, in the same way as with the buffer region for writing, if the size of the unit buffer region for storage is not an integer multiple of the unit reading data amount, the buffer region for reading is absolutely necessary. Therefore, a structure may be used in which it is reserved at the time of initialization and freed at the time when the buffer module 40 is deleted.

In next step 470, among the effective data pointers corresponding to the image processing module 38 which is the source of the reading request, the pointer indicating the head position of the effective data is updated (refer also to FIG. 11C). The updating of the pointer is achieved by moving the head position of the effective data which is indicated by the pointer, rearward by an amount corresponding to the unit reading data amount. If the effective data which is the object of reading this time is data corresponding to the end of the image data which is the object of processing, pointer updating is carried out by moving the head position of the effective data rearward by an amount corresponding to the size of the effective data which is the object of reading this time which was notified also to the image processing module 38 which is the source of the reading request.

In step 472, the effective data pointers corresponding to the individual following image processing modules 38 are respectively referred to, and it is judged whether or not, due to the pointer updating of step 470, a unit buffer region for which reading of the stored image data by the respective following image processing modules 38 has all been completed, i.e., a unit buffer region in which no effective data is stored, has appeared among the unit buffer regions structuring the buffer 40A. If the judgment is negative, the routine proceeds to step 478 without any processing being carried out. If the judgment is affirmative, the routine proceeds to step 474 where it is judged whether or not the buffer flag is 1. If its own module is the buffer module 40 generated by the module generating section 44, the judgment is negative and the routine proceeds to step 476 where the resource managing section 46B is requested to free the unit buffer region in which no effective data is stored.

If its own module is the buffer module 40 generated by the application 32, the judgment in step 474 is affirmative, and the routine moves on to step 478 without any processing being carried out. Accordingly, if a buffer region (memory region) designated by the user is used as the buffer 40A, that buffer region is stored without being freed. Then, in step 478, the number of waiting requests is decreased by 1, the data reading processing ends, and the routine returns to step 378 of the buffer control processing (FIG. 6).

On the other hand, in a case in which the data amount of the effective data which is stored in the buffer 40A and which can be read by the image processing module 38 which is the source of the reading request is less than the unit reading data amount, and the end of the effective data which can be read is not the end of the image data which is the object of processing (i.e., in a case in which it is sensed that there is no readable effective data in (4) of FIG. 15B), the judgments of steps 452 and 454 are both negative, and the routine proceeds to step 480. In step 480, a data request, which requests new image data, is outputted to the workflow managing section 46A (see (5) in FIG. 15B as well). In this case, a processing request is inputted by the workflow managing section 46A to the preceding image processing module 38 of its own module. Further, in step 482, the request information, which was taken-out from the queue in previous step 382 (FIG. 6), is again registered at the end of the original queue, and the data reading processing ends.

As shown in FIG. 6, when the data reading processing ends, the routine returns to step 378. In this case, if no other request information is registered in the queue, the request information which is registered again at the end of the queue is immediately taken-out again from the queue, and the data reading processing of FIG. 10 is again executed. If other request information is registered in the queue, the other request information is taken-out and processing corresponding thereto is carried out, and thereafter, the request information which is registered again at the end of the queue is again taken-out from the queue, and the data reading processing of FIG. 10 is executed again. Accordingly, in a case in which a reading request from the following image processing module 38 is inputted but the data amount of the effective data which can be read by the image processing module 38 which is the source of the reading request is less than the unit reading data amount, and the end of the effective data which can be read is not the end of the image data which is the object of processing, the corresponding request information is stored and the data reading processing is executed repeatedly until either the data amount of the effective data which can be read becomes greater than or equal to the unit reading data amount, or it is sensed that the end of the effective data which can be read is the end of the image data which is the object of processing (i.e., until the judgment of step 452 or step 454 is affirmative).

Although details thereof will be described later, when a data request is inputted from the buffer module 40, the workflow managing section 46A inputs a processing request to the preceding image processing module 38 of the buffer module 40 which is the source of the data request (refer to (6) in FIG. 15B as well). Due to processing which is triggered by the input of this processing request and which is carried out at the control section 38B of the preceding image processing module 38, when the preceding image processing module 38 becomes able to write image data to the buffer module 40, due to a writing request being inputted from the preceding image processing module 38, the above-described data writing processing (FIG. 8) is carried out, and image data is written to the buffer 40A of the buffer module 40 from the preceding image processing module 38 (refer also to (7), (8) of FIG. 15B). In this way, reading of the image data from the buffer 40A by the following image processing module 38 is carried out (refer also to (9) of FIG. 15B).

As described above, in the buffer control processing relating to the present embodiment, each time either a writing request is inputted from the preceding image processing module 38 or a reading request is inputted from the following image processing module, the inputted request is registered in a queue as request information, and the request information is taken-out one-by-one from the queue and processed. Therefore, even in cases such as when a reading request is inputted during execution of the data writing processing or a writing request is inputted during execution of the data reading processing, exclusive control, which stops execution of the processing corresponding to the inputted request, is carried out until the processing being executed is completed and a state arises in which processing corresponding to the inputted request can be executed. In this way, even if the CPU 12 of the computer 10 executes in parallel processes or threads corresponding to individual modules structuring the image processing section 50, it is possible to avoid the occurrence of problems due to plural requests being inputted simultaneously or substantially simultaneously to a single buffer module 40. Accordingly, the CPU 12 of the computer 10 can execute in parallel processes or threads corresponding to individual modules. Of course, the buffer module may be realized as a usual program or object.

Figure 13:
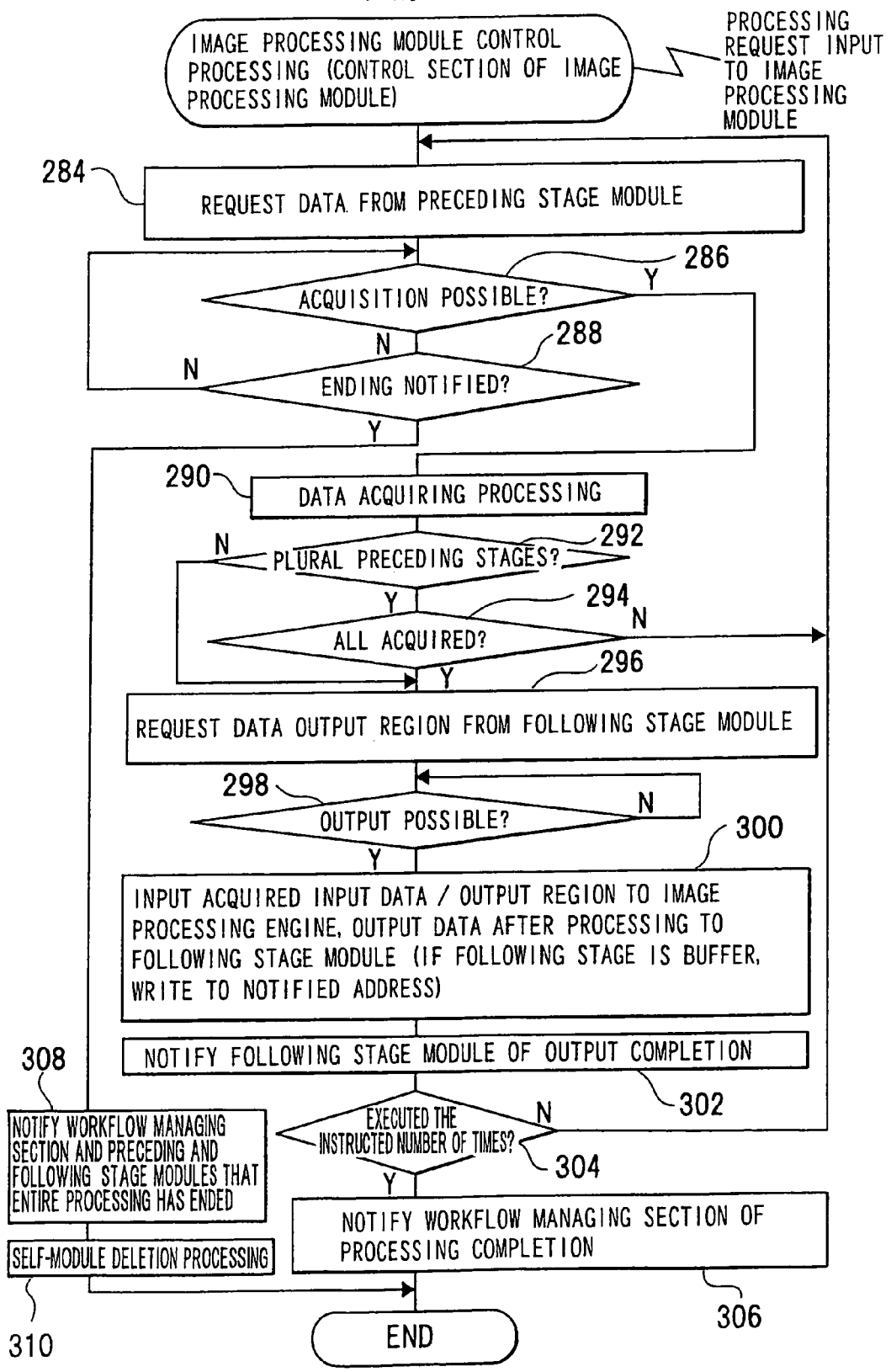
FIG. 13 is a flowchart showing the contents of image processing module control processing executed by the control section of the image processing module.

Next, description will be given of image processing module control processing (FIG. 13) which is carried out by the respective control sections 38B of the individual image processing modules 38, each time a processing request is inputted from the workflow managing section 46A to the individual image processing modules 38 structuring the image processing section 50. In the image processing module control processing, first, in step 284, in a case in which a preceding module (the buffer module 40, or the image data supplying section 22, the image processing module 38, or the like) of its own module exists, data (image data, or the results of processing of image processing such as analysis or the like) is requested from that preceding module. In next step 286, it is judged whether data can be acquired from the preceding module. If the judgment is negative, in step 288, it is judged whether or not notification has been given of the ending of the entire processing. If the judgment of step 288 is negative, the routine returns to step 286, and steps 286 and 288 are repeated until it becomes possible to acquire data from the preceding module. If the judgment in step 286 is affirmative, in step 290, data acquiring processing, which acquires data from the preceding module, is carried out.

Here, when the preceding module of its own module is the buffer module 40, when data is requested in previous step 284 (a reading request) immediately, the head address of the read region is notified from the buffer module 40 and reading of the data is asked for (see step 462 of FIG. 10), if there is a state in which the effective data which can be read is stored in the buffer 40A of the buffer module 40 in an amount which is greater than or equal to the unit reading data amount, or the end of the effective data which can be read coincides with the end of the image data which is the object of processing. If neither of these states exists, as the preceding image processing module 38 of the buffer module 40 writes image data to the buffer 40A of that buffer module 40, the state changes to the aforementioned state, and thereafter, the head address of the read region is notified from the buffer module 40 and reading of the image data is asked for (see step 462 of FIG. 10). In this way, the judgment of step 286 is affirmative, and the routine proceeds to step 290. In step 290, data acquiring processing, which reads image data of the unit reading data amount (or a data amount less than that) from the read region whose head address has been notified by the preceding buffer module 40, is carried out (refer to (3) in FIG. 15A).

Further, if the preceding module of its own module is the image data supplying section 22, when a data request is outputted in previous step 284, notification is given immediately from the image data supplying section 22 of the preceding stage that there is a state in which image data can be acquired. In this way, the judgment of step 286 is affirmative, and the routine proceeds to step 290 where image data acquiring processing, which acquires image data of the unit reading data amount from the image data supplying section 22 of the preceding stage, is carried out. Further, if the preceding module of its own module is the image processing module 38, when a data request (processing request) is outputted in previous step 284, if there is a state in which the preceding image processing module 38 can execute image processing, due to a writing request being inputted, notification is given that there is a state in which data (the results of image processing) can be acquired. Therefore, the judgment of step 286 is affirmative, and the routine proceeds to step 290. Due to the preceding image processing module 38 giving notice of the address of the buffer region in which data is to be written and asking for writing, data acquiring processing is carried out which writes, to that buffer, the data outputted from the preceding image processing module 38.

In next step 292, the control section 38B judges whether or not plural modules are connected at the preceding stage of its own module. If the judgment is negative, the routine moves on to step 296 without any processing being carried out. If the judgment is affirmative, the routine proceeds to step 294 where it is judged whether or not data has been acquired from all of the preceding modules. If the judgment in step 294 is negative, the routine returns to step 284, and step 284 through step 294 are repeated until the judgment of step 294 is affirmative. When all of the data which is to be acquired from the preceding modules is gathered, either the judgment of step 292 is negative or the judgment of step 294 is affirmative, and the routine moves on to step 296.

Next, in step 296, the control section 38B requests the following module of its own module for a region for data output. In step 298, judgment is repeated until a data output region can be acquired (i.e., until the head address of a data output region is notified). Note that, if the following module is the buffer module 40, the aforementioned request for a region for data output is formed by outputting a writing request to that buffer module 40. When a data output region (if the following module is the buffer module 40, a write region whose head address is notified from that buffer module 40) can be acquired (refer to (4) in FIG. 15A), in next step 300, the data obtained by the previous data acquiring processing and (the head address of) the data output region acquired from the following module are inputted to the image processing engine 38A. A predetermined image processing is carried out on the inputted data (see (5) of FIG. 15A), and the data after processing is written to the data output region (see (6) of FIG. 15A). When input of data of the unit reading data amount to the image processing engine 38A is completed and the data outputted from the image processing engine 38A is all written to the data output region, in next step 302, the following module is notified that output is completed.

Due to above-described step 284 through step 302, the processing of data of the unit processing data amount (i.e., unit processing) at the image processing module 38 is completed. There are cases in which the number of times of execution of the unit processing is designated by the workflow managing section 46A in the processing request which is inputted from the workflow managing section 46A to the image processing module 38. Therefore, in step 304, it is judged whether or not the number of times of execution of the unit processing has reached the number of times of execution instructed by the inputted processing request. If the instructed number of times of execution of the unit processing is one time, this judgment is unconditionally affirmative. However, if the instructed number of times of execution of the unit processing is greater than or equal to 2, the routine returns to step 284, and step 284 through step 304 are repeated until the judgment of step 304 is affirmative. When the judgment of step 304 is affirmative, the routine proceeds to step 306. In step 306, by outputting a processing completed notice to the workflow managing section 46A, the control section 38B notifies the workflow managing section 46A that processing corresponding to the inputted processing request is completed, and the image processing module control processing ends.

Further, when processing is carried out until the end of the image data which is the object of processing due to the above-described processings being repeated each time a processing request is inputted from the workflow managing section 46A, the judgment of step 288 becomes affirmative due to notice of the end of the image data which is the object of processing being given from the preceding module, and the routine moves on to step 308. In step 308, the control section 38B outputs an entire processing completed notice, which means that processing of the image data which is the object of processing is completed, to the workflow managing section 46A and to the following module. In next step 310, self-module deletion processing (to be described later) is carried out, and the image processing module control processing ends.

Note that the image processing engine 38A, which carries out the image analyzing processing such as skew angle sensing processing or the like, is often structured such that the image processing results are not outputted in units of the unit reading data amount, but the image processing results are outputted after all of the image data which is the object of processing has been inputted. At the control section 38B of an image processing module 38 having such an image processing engine 38A, steps 296 and 298 of the image processing module control processing (FIG. 13) and output of data to the following module in step 300 are not carried out, and when the judgment in step 288 is affirmative due to the image data which is the object of processing being processed until the end, the data (image processing results) outputted from the image processing engine 38A is outputted to the exterior of its own module (to the workflow managing section 46A or the application 32). Then, if there is another image processing module 38 which requires the above-described image processing results (e.g., the image processing module 38 which carries out image rotating processing on the basis of the results of the skew angle sensing processing, or the like), the aforementioned image processing results are inputted from the workflow managing section 46A or the application 32 to that image processing module 38.

Figure 16A:
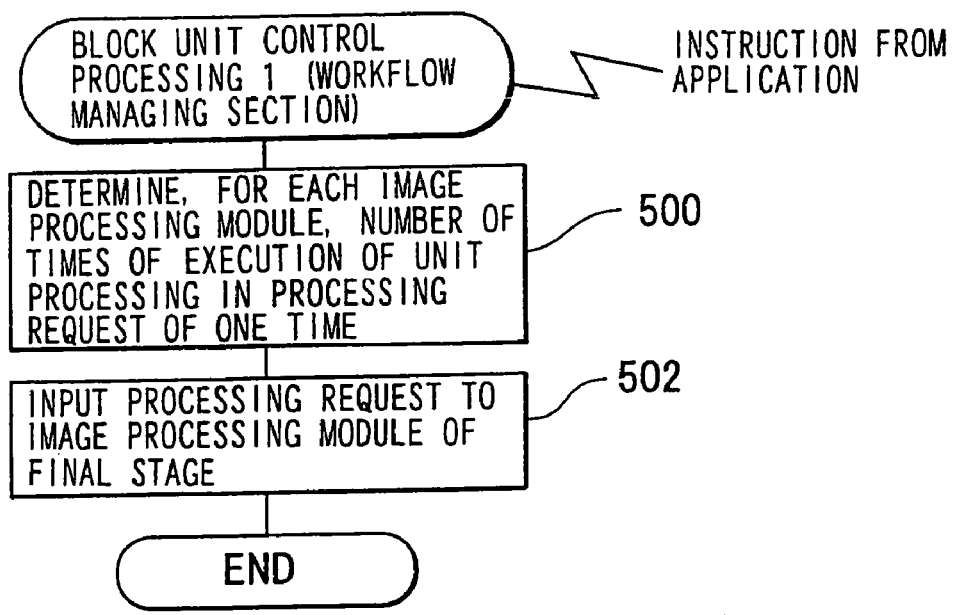
FIGS. 16A to 16D are flowcharts showing the contents of block unit control processing executed by a processing managing section.

On the other hand, in a case in which block unit processing is designated as the form of execution of the image processing, when the workflow managing section 46A is started-up by the application 32, the block unit control processing 1 shown in FIG. 16A is carried out. As described above as well, in the input of a processing request from the workflow managing section 46A to the individual image processing modules 38 of the image processing section 50, it is possible to designate the number of times of execution of the unit processing. In step 500 of the block unit control processing 1, the number of times of execution of the unit processing designated in a processing request of one time is set for each of the individual image processing modules 38. The number of times of execution of the unit processing per processing request of one time can be determined such that, for example, the number of times of input of the processing request to the individual image processing modules 38 during the time that all of the image data which is the object of processing is being processed, is averaged, or may be determined in accordance with another standard. Then, in next step 502, a processing request is inputted to the image processing module 38 of the final stage of the image processing section 50 (refer to (1) of FIG. 18 as well), and the block unit control processing 1 ends.

Figure 18:
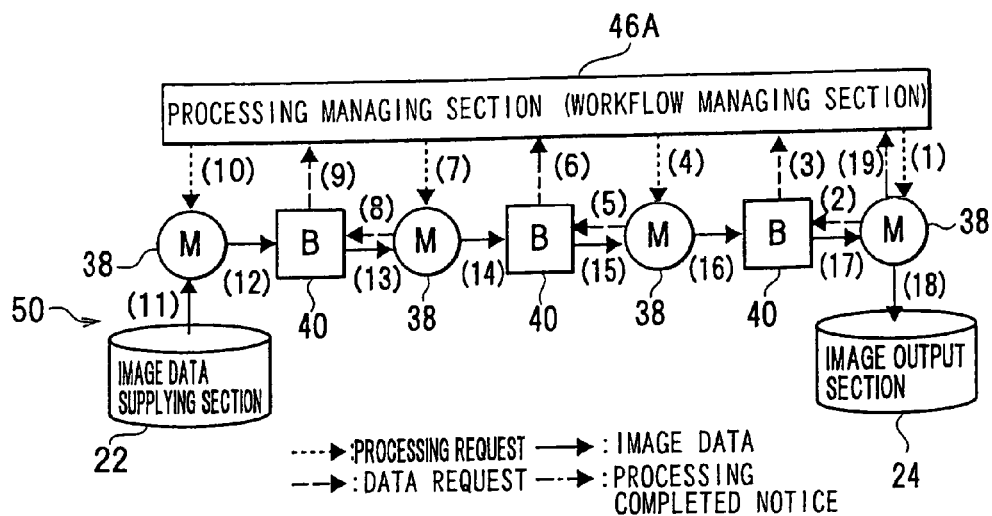
FIG. 18 is a schematic diagram explaining the flow of the block unit processing and the whole image processing.

Here, in the image processing section 50 shown in FIG. 18, when a processing request is inputted from the workflow managing section 46A to an image processing module 38$_4$ of the final stage, the control section 38B of the image processing module 38$_4$ inputs a reading request to a preceding buffer module 40$_3$ (refer to (2) of FIG. 18). At this time, no effective data (image data) which can be read by the image processing module 384 is stored in the buffer 40A of the buffer module 40$_3$. Therefore, the buffer control section 40B of the buffer module 40$_3$ inputs a data request to the workflow managing section 46A (refer to (3) of FIG. 18).

Figure 16B:
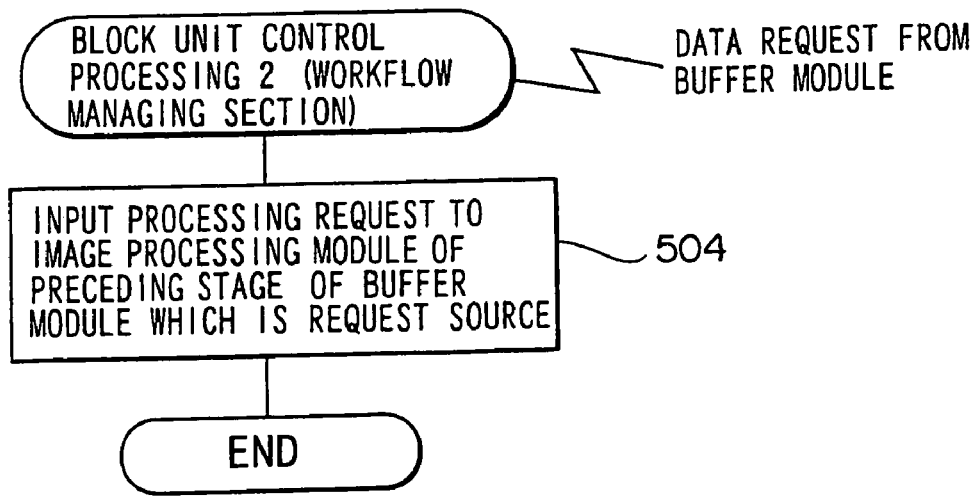

In a case in which the form of execution of the image processing is block unit processing, each time a data request is inputted from the buffer module 40, the block unit control processing 2 shown in FIG. 16B is carried out. In this block unit control processing 2, in step 504, on the basis of the information registered in the table shown in FIG. 4B, the preceding image processing module 38 (here, an image processing module 38$_3$) of the buffer module 40 which is the input source of the data request (here, the buffer module 40$_3$), is recognized, and a processing request is inputted to the recognized preceding image processing module 38 (refer to (4) of FIG. 18), and the processing ends.

When a processing request is inputted, the control section 38B of the image processing module 38$_3$ inputs a reading request to a preceding buffer module 40$_2$ (refer to (5) of FIG. 18). Because image data which can be read is also not stored in the buffer 40A of the buffer module 40$_2$, the buffer control section 40B of the buffer module 40$_2$ inputs a data request to the workflow managing section 46A (refer to (6) of FIG. 18).

Also when a data request is inputted from the buffer module 40$_2$, the workflow managing section 46A again carries out the above-described block unit control processing 2, and thereby inputs a processing request to an preceding image processing module 38$_2$ (refer to (7) of FIG. 18). The control section 38B of the image processing module 38$_2$ inputs a reading request to a preceding buffer module 40$_1$ of (refer to (8) of FIG. 18). Further, because image data which can be read is also not stored in the buffer 40A of the buffer module 40$_1$, the buffer control section 40B of the buffer module 40$_1$ also inputs a data request to the workflow managing section 46A (refer to (9) of FIG. 18). Also when a data request is inputted from the buffer module 40$_1$, the workflow managing section 46A again carries out the above-described block unit control processing 2, and thereby inputs a processing request to an preceding image processing module 381 (refer to (10) of FIG. 18).

Here, the preceding module of the image processing module 38$_1$ is the image data supplying section 22. Therefore, by inputting a data request to the image data supplying section 22, the control section 38B of the image processing module 38, acquires image data of the unit reading data amount from the image data supplying section 22 (refer to (11) of FIG. 18). The image data, which is obtained by the image processing engine 38A carrying out image processing on the acquired image data, is written to the buffer 40A of the following buffer module 40$_1$ (refer to (12) of FIG. 18). Note that, when the control section 38B of the image processing module 38$_1$ finishes the writing of image data to the buffer 40A of the following buffer module 40$_1$, the control section 38B inputs a processing completed notice to the workflow managing section 46A.

Figure 16C:
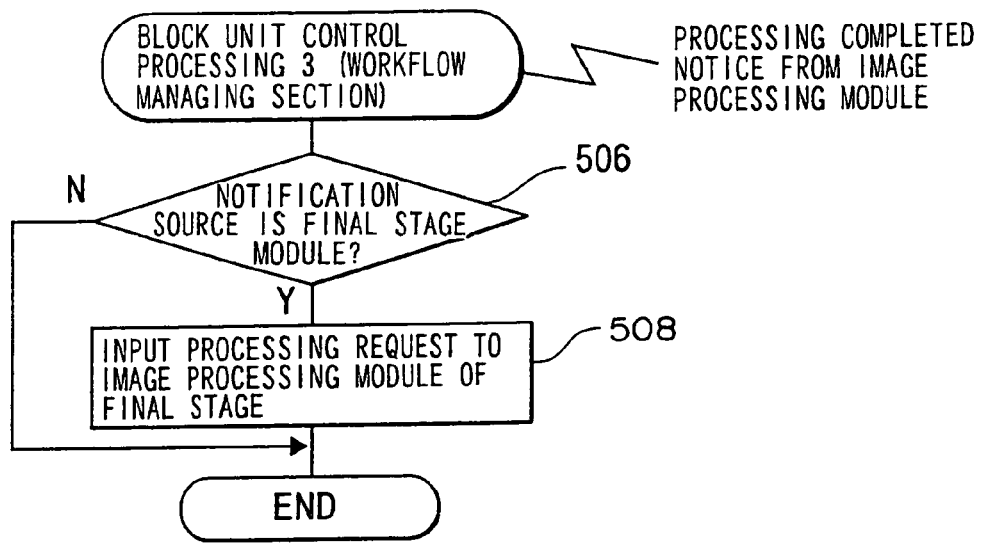

In a case in which the form of execution of the image processing is block unit processing, each time a processing completed notice is inputted from the image processing module 38, the workflow managing section 46A carries out the block unit control processing 3 shown in FIG. 16C. In this block unit control processing 3, in step 506, it is judged whether or not the source of the processing completed notice is the image processing module 38 of the final stage of the image processing section 50. If the judgment is negative in this case, the processing ends without any processing being carried out (the same holds for cases in which a processing completed notice is inputted from the image processing module 38$_2$, 38$_3$).

Further, when effective data, which can be read by the following image processing module 38$_2$ and which is of an amount which is greater than or equal to the unit reading data amount, is written, the buffer control section 40B of the buffer module 40$_1$ requests reading to the image processing module 38$_2$.

Accompanying this, the control section 38B of the image processing module 382 reads image data of the unit reading data amount from the buffer 40A of the buffer module 40$_1$ (refer to (13) of FIG. 18), and the image processing engine 38A carries out image processing on the acquired image data. The image data obtained in this way is written to the buffer 40A of the following buffer module 40$_2$ (refer to (14) of FIG. 18). When effective data, which can be read by the following image processing module 38$_3$ and which is of an amount which is greater than or equal to the unit reading data amount, is written, the buffer control section 40B of the buffer module 40$_2$ requests reading to the image processing module 38$_3$. The control section 38B of the image processing module 38$_3$ reads image data of the unit reading data amount from the buffer 40A of the buffer module 40$_2$ (refer to (15) of FIG. 18), and the image processing engine 38A carries out image processing on the acquired image data. The image data obtained in this way is written to the buffer 40A of the following buffer module $40_3$ (refer to (16) of FIG. 18).

Further, when effective data, which can be read by the following image processing module $38_4$ and which is of an amount which is greater than or equal to the unit reading data amount, is written, the buffer control section 40B of the buffer module $40_3$ requests reading to the image processing module $38_4$. Accompanying this, the control section 38B of the image processing module $38_4$ reads image data of the unit reading data amount from the buffer 40A of the buffer module $40_3$ (refer to (17) of FIG. 18), and the image processing engine 38A carries out image processing on the acquired image data. The image data obtained in this way is outputted to the image outputting section 24 which is the following module (refer to (18) of FIG. 18). Further, when the control section 38B of the image processing module $38_4$ completes the writing of image data to the image outputting section 24, the control section 38B inputs a processing completed notice to the workflow managing section 46A (refer to (19) in FIG. 18). In this case, the judgment in step 506 of the aforementioned block unit control processing 3 is affirmative, and the routine proceeds to step 508 where a processing request is again inputted to the image processing module $38_4$ which is the final-stage image processing module 38, and thereafter, processing ends.

Due to a processing request being re-inputted to the image processing module 384 which is the final stage, the above-described processing sequence is repeated again, and image processing, which is in a form of execution of block units, is successively carried out on the image data which is the object of processing. When the image data supplied from the image data supplying section 22 reaches the end of it, input of entire processing ended notices from the individual image processing modules 38 to the workflow managing section 46A is successively carried out from the preceding image processing modules 38.

Figure 16D:
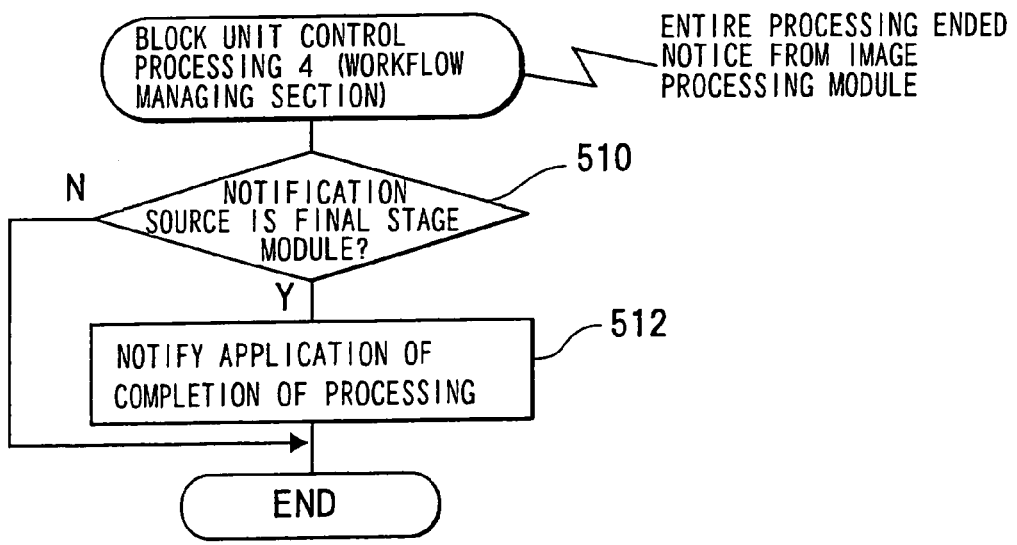

In a case in which the form of execution of the image processing is block unit processing, each time an entire processing ended notice is inputted from the image processing module 38, the workflow managing section 46A carries out the block unit control processing 4 shown in FIG. 16D. In this block unit control processing 4, in step 510, it is judged whether or not the image processing module 38, which is the source of input of the entire processing ended notice, is the image processing module 38 of the final stage. If this judgment is negative, processing ends without any processing being carried out. In a case in which an entire processing ended notice is inputted from the image processing module 38 of the final stage due to all of the image data, which is obtained by the necessary image processings being carried out on the image data which is the object of processing, being outputted to the image outputting section 24, the judgment of step 510 is affirmative, and the routine moves on to step 512. In step 512, the application 32 is notified of the completion of image processing (refer to step 180 of FIG. 3 as well), and the block unit control processing ends. Then, the application 32, which has been notified of the completion of image processing, notifies the user that image processing has been completed (refer to step 182 in FIG. 3 as well).

In this way, in the block unit processing, a processing request inputted to the image processing module 38 of the final stage is transferred backward to the preceding image processing modules 38. When the processing request reaches the image processing module 38 of the forward-most stage, a series of image processings is carried out by a flow in which image processing is carried out at the image processing module 38 of the forward-most stage, data is written to the following buffer module 40, and if the written data suffices, the processing proceeds to the following module.

Figure 17A:
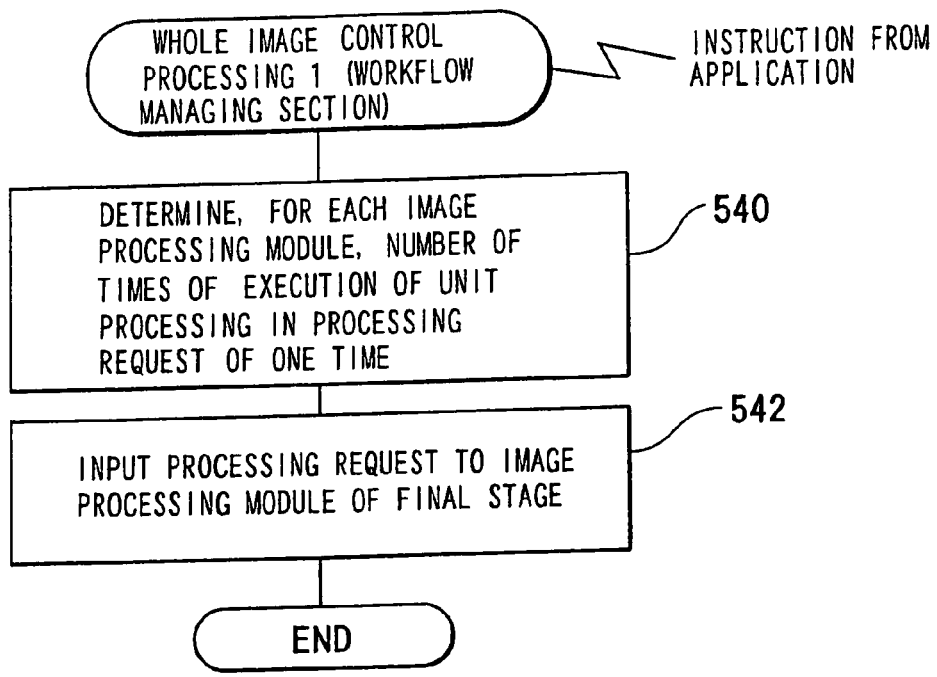
FIGS. 17A to 17D are flowcharts showing the contents of whole image control processing executed by the processing managing section.
Figure 17B:
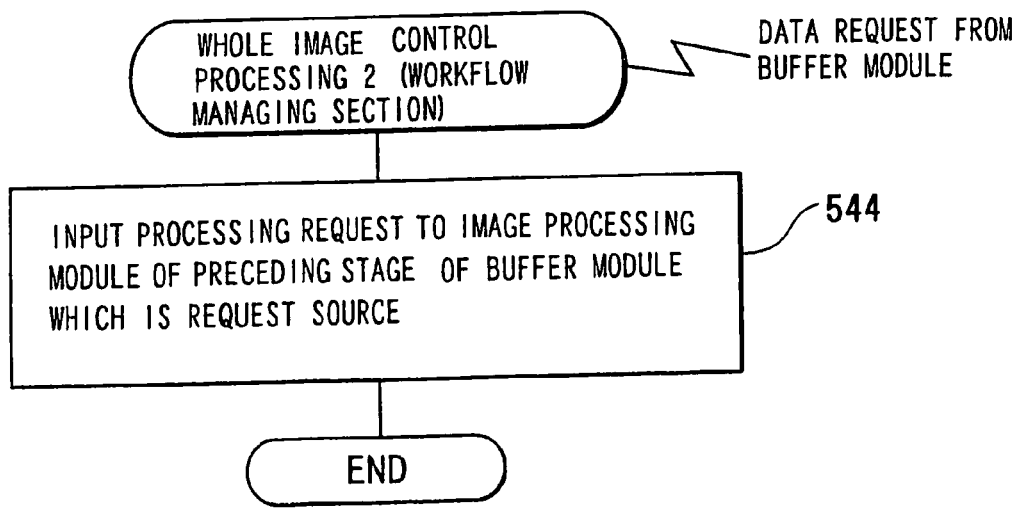
Figure 17C:
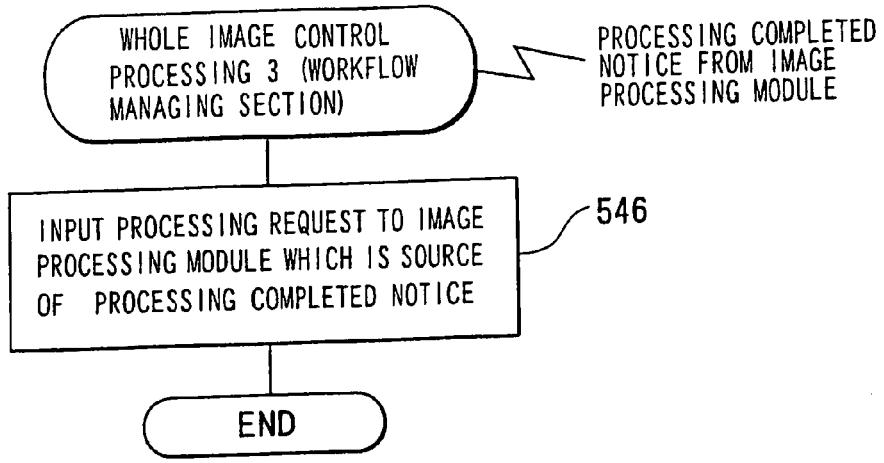
Figure 17D:
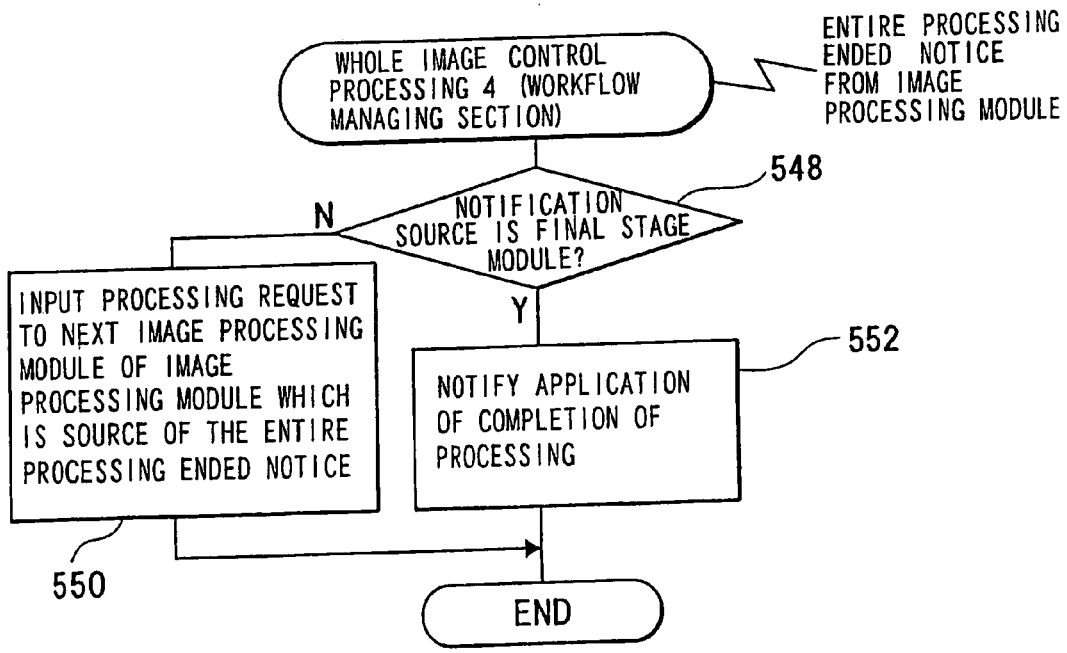

In a case in which whole image processing is designated as the form of execution of the image processing, when the workflow managing section 46A is started-up by the application 32, the whole image control processing 1 shown in FIG. 17A is carried out. In the whole image control processing 1, in the same way as in the above-described block unit control processing 1 (FIG. 16A), the number of times of execution of the unit processing designated by a processing request of one time, is set for each of the individual image processing modules 38 (step 540). In next step 542, a processing request is inputted to the image processing module 38 of the final stage in the image processing section 50 (refer to (1) of FIG. 18), and processing ends. Further, in a case in which the form of execution of the image processing is whole image processing, each time a data request is inputted from the buffer module 40, the workflow managing section 46A carries out the whole image control processing 2 shown in FIG. 17B. In the whole image control processing 2, in the same way as in the above-described block unit control processing 2 (FIG. 16B), in step 544, on the basis of information registered in the table shown in FIG. 4B, the preceding image processing module 38 of the buffer module 40 which is the source of input of the data request is recognized, a processing request is inputted to the recognized preceding image processing module 38, and processing ends.

In this way, even if the form of execution of the image processing is whole image processing, the processing which the workflow managing section 46A carries out when started-up by the application 32, and the processing which the workflow managing section 46A carries out each time a data request is inputted from the buffer module 40, are the same as at the time when the form of execution of the image processing is block unit processing. Accordingly, in the whole image processing as well, after a processing request is inputted from the workflow managing section 46A to the image processing module 38 of the final stage of the image processing section 50, as shown in (2) through (10) of FIG. 18, the input of a data request to the preceding buffer module 40 from the image processing module 38 to which the processing request was inputted, and the input of a processing request to the preceding image processing module of the buffer module 40 from the workflow managing section 46A accompanying the input of a data request to the workflow managing section 46A from that buffer module 40 to which the data request was inputted, proceed successively from the image processing module 38 of the final stage of the image processing section 50 to the image processing module 38 at the forward-most stage of the image processing section 50.

Further, when a processing request is inputted from the workflow managing section 46A, the image processing module $38_1$ of the forward-most stage of the image processing section 50 acquires image data of the unit reading data amount from the image data supplying section 22 (refer to (11) of FIG. 18). The image processing module $38_1$ writes the image data, which is obtained by the image processing engine 38A carrying out image processing on the acquired image data, to the buffer 40A of the following buffer module $40_1$ (refer to (12) of FIG. 18), and inputs a processing completed notice to the workflow managing section 46A. In a case in which the form of execution of image processing is whole image processing, each time a processing completed notice is inputted from the image processing module 38, the workflow managing section 46A carries out the whole image control processing 3 shown in FIG. 17C. In the whole image control processing 3, in step 546, the processing request is re-inputted to the image processing module 38 which is the source of the processing completed notice, and processing ends. In this way, in the whole image control processing, during the period of time until the specific image processing module 38, which inputted the processing completed notice to the workflow managing section 46A, completes image processing on the image data which is the object of processing, each time a processing completed notice is inputted from that specific image processing module 38, the processing request is repeatedly inputted only to that specific image processing module 38.

When the image processing module $38_1$ completes image processing of the image data which is the object of processing, and all of the image data, which is the object of processing and which has undergone image processing at the image processing module $38_1$, is stored in the buffer 40A of the buffer module $40_1$, an entire processing ended notice is inputted from the image processing module $38_1$ to the workflow managing section 46A. In a case in which the form of execution of the image processing is whole image processing, each time an entire processing ended notice is inputted from the image processing module 38, the workflow managing section 46A carries out the whole image control processing 4 shown in FIG. 17D. In this whole image control processing 4, in step 548, it is judged whether or not the source of the entire processing ended notice is the image processing module 38 of the final stage of the image processing section 50. If the judgment is negative, the routine moves on to step 550 where, on the basis of the information registered in the table shown in FIG. 4B, the image processing module 38, which is next after the image processing module 38 which is the source of the entire processing ended notice, is recognized, a processing request is inputted to this recognized next image processing module 38, and processing ends.

In this way, in the whole image control processing, a processing request inputted to the image processing module 38 of the final stage is transferred backward to the further preceding image processing modules 38, and after reaching the image processing module 38 of the forward-most stage, the processing request is repeatedly inputted only to the image processing module 38 of the forward-most stage. When image processing at that image processing module 38 of all of the image data which is the object of processing is completed, image processing on all of the image data which is the object of processing is carried out at the next image processing module 38. Due to this processing proceeding in order to the following image processing modules 38, the series of image processing operations is carried out. Then, when an entire processing ended notice is inputted from the image processing module 38 of the final stage due to all of the image data, which is obtained by the needed image processings being carried out on the image data which is the object of processing, being outputted to the image outputting section 24, the judgment of step 548 of the whole image control processing 4 (FIG. 17D) is affirmative, and the routine proceeds to step 552. In step 552, the application 32 is notified of the completion of image processing (refer to step 180 of FIG. 3 as well), and the whole image control processing ends. Then, the application 32, which is informed of the completion of image processing, notifies the user that image processing is completed (refer to step 182 of FIG. 3 as well).

In the whole image control processing shown in FIG. 17, the image processing module 38, to which the processing request is repeatedly inputted, is switched on the occasion of the inputting of the entire processing ended notice from the image processing module. However, the present invention is not limited to the same. A structure may be used in which the image processing module 38, to which the processing request is repeatedly inputted, is switched on the occasion of the inputting of the processing ended notice from another image processing module 38.

Further, in the above description, the input of the processing request to the image processing module 38 of the final stage is carried out by the workflow managing section 46A. However, the present invention is not limited to the same. The workflow managing section 46A may hold the module, which is positioned at the final stage of a pipeline or at plural final points of a directed acyclic graph, and carry out the processing request, or the application 32 may hold these modules and carry out the processing request. Or, as in the example of above-described FIG. 5B, in a case in which, at the interior of the module generating section 44, an image processing module which carries out skew angle sensing processing and an image processing module which carries out image rotating processing are combined so as to form a skew correcting processing module, the skew angle information is needed as a processing parameter at the time of generating the image rotating processing module. Thus, at the interior of the skew correcting module generating section, it is also possible to employ a method in which a processing request is repeatedly made to the skew angle sensing processing module, and the entire image is processed, and the skew angle information obtained as a result thereof is provided to the image rotating processing module as a processing parameter.

Next, description will be given of the deleting of the image processing module 50, which is carried out after image processing on the image data which is the object of processing has been completed. In step 308 of the image processing module control processing (FIG. 13), the control section 38B of the individual image processing module 38 outputs an entire processing ended notice to the workflow managing section 46A and to the following module, and thereafter, in step 310, carries out self-module deletion processing.

Figure 14:
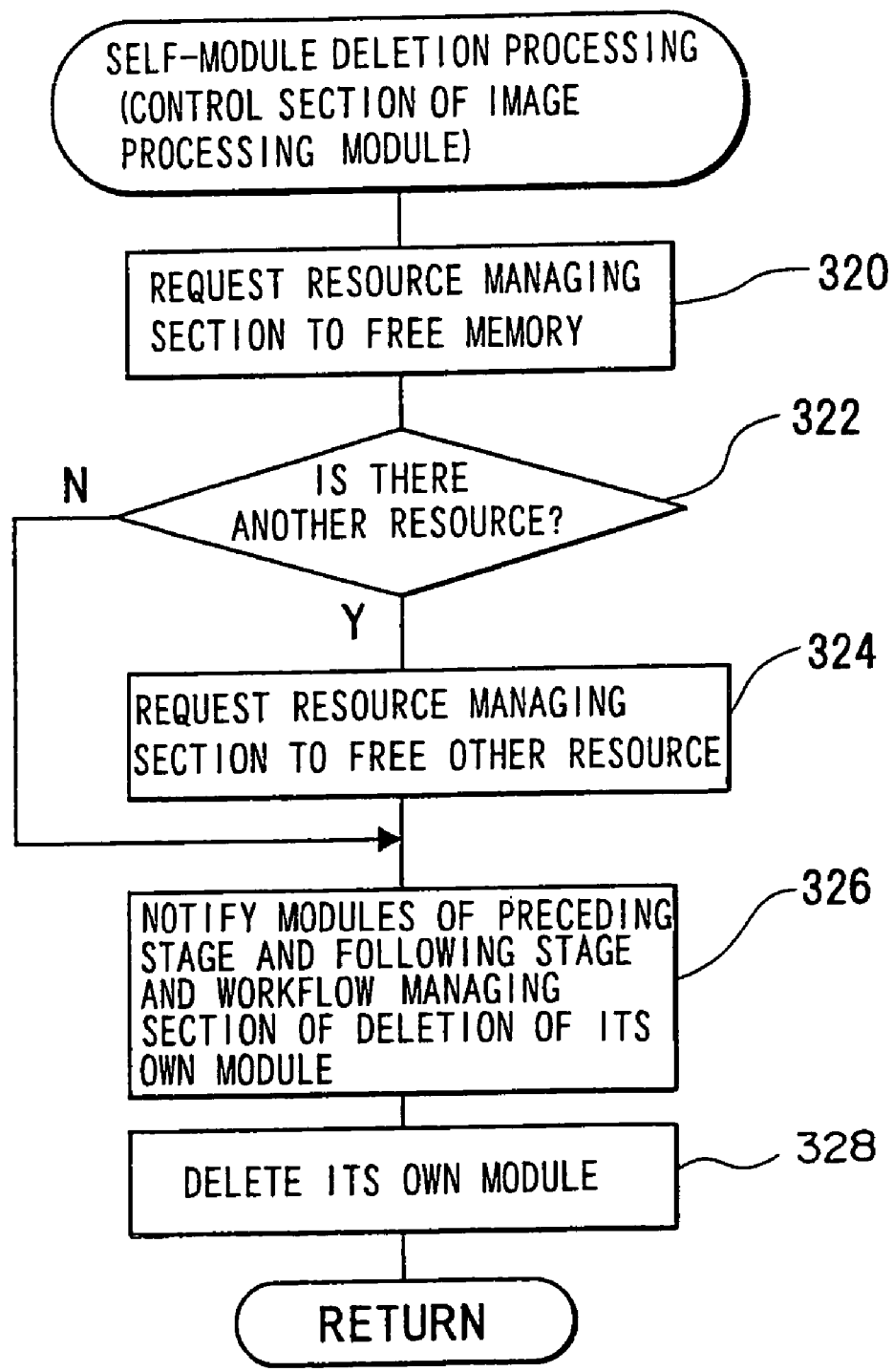
FIG. 14 is a flowchart showing the contents of self-module deleting processing executed by the control section of the image processing module.

As shown in FIG. 14, in the self-module deletion processing, first, in step 320, the control section 38B requests the resource managing section 46B to free the memory region reserved in previous step 254 (FIG. 12). In this way, due to the processing for a memory freeing request (FIG. 2C) being carried out at the resource managing section 46B, this memory region is freed. In next step 322, it is judged whether or not there is a resource, other than the memory, which its own module reserved through the resource managing section 46B. If the judgment is negative, the routine moves on to step 326 without any processing being carried out. If the judgment is affirmative, the routine moves on to step 324. In step 324, the control section 38B notifies the resource managing section 46B of the identification information of its own module, and requests the freeing of the resource, other than the memory, which its own module reserved. In this way, due to the processing for a resource freeing request (FIG. 2E) being carried out at the resource managing section 46B, this resource is freed.

In the self-module deletion processing (FIG. 14), the routine proceeds to step 326 if the judgment in step 322 is negative, or if, after the resource managing section 46B is requested to free a resource other than the memory in step 324, a notice that resource freeing is completed is given from the resource managing section 46B. In step 326, the control section 38B inputs a deletion notice, for giving notice that processing for deleting its own module is to be carried out, to the preceding module of its own module, the following module of its own module, and the workflow managing section 46A. Then, in step 328, the processing of deleting its own module is carried out, and the self-module deleting processing of FIG. 14 (i.e., step 310 of FIG. 13) ends. Note that deleting of its own module can be realized by either ending the process or thread corresponding to its own module, or deleting the object.

In the buffer control processing (FIG. 6) carried out by the buffer control section 40B of the buffer module 40, when a deletion notice is inputted from the image processing module 38 of the preceding or the following stages of its own module, the judgment in step 380 is affirmative, and the routine moves on to step 390. In step 390, after the module which is the source of input of the deletion notice is stored, it is judged whether or not deletion notices have been inputted from all of the modules of the preceding and the following stages of its own module. If the judgment is negative, the routine returns to step 378, and steps 378 and 380 are repeated as described above as well. Further, when deletion notices are inputted from all of the modules of the preceding and the following stages of its own module, the judgment in step 390 is affirmative, and the routine proceeds to step 392. In step 392, due to a deletion notice being inputting to the workflow managing section 46A, notice is given that the processing of deleting its own module is to be carried out. Then, in next step 394, processing for deleting its own module is carried out, and the buffer control processing (FIG. 6) ends.

Figure 19:
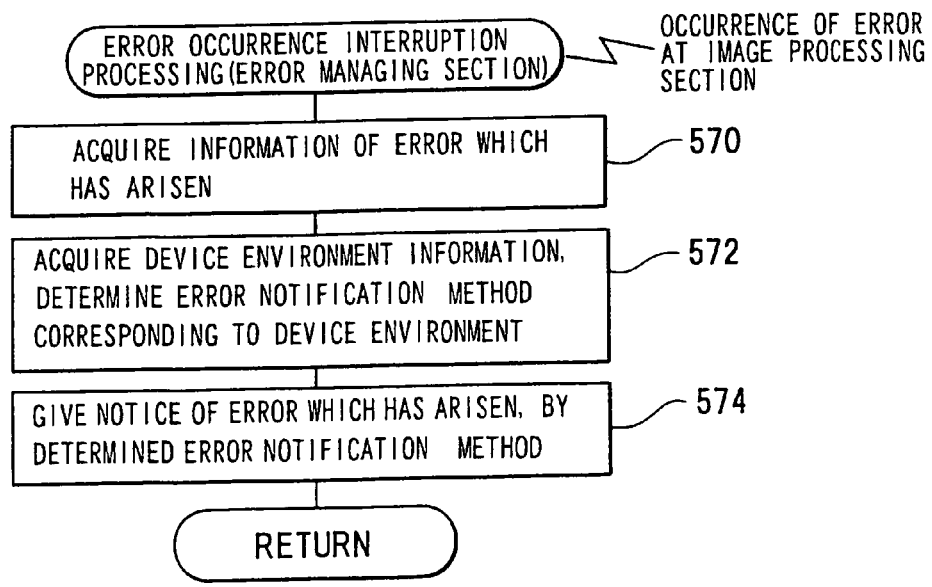
FIG. 19 is a flowchart showing the contents of error occurrence interruption processing executed by the processing managing section.

Finally, processing in a case in which an error arises while the image processing section 50 is executing image processing will be described. When an error arises while the image processing section 50 is executing image processing, the error managing section 46C of the processing managing section 46 carries out the error occurrence interruption processing shown in FIG. 19 due to an interruption arising. In this error occurrence interruption processing, first, in step 570, error information, such as the type of, the place of occurrence of, and the like of the error which has arisen is acquired. In the present embodiment, the storage 20 stores device environment information, which expresses the type and the structure and the like of the device in which is incorporated the computer 10 in which the image processing program group 34 is implemented. In next step 572, this device environment information is acquired from the storage 20 or the like, and an error notification method, which corresponds to the device environment expressed by the acquired device environment information, is determined.

For example, if the computer 10 is an independent computer such as a PC or the like, a display at which various information can be displayed at one time is provided as the display 16. Therefore, an error notification method, such as displaying all of the contents of the error information acquired in step 570 on the display 16 by a pop-up window or the like, can be selected as the error notification method. Further, for example, if the device in which the computer 10 is incorporated is a device such as a copier, a printer, a fax machine, a multifunction device, a scanner, a photographic printer, or the like, the amount of information which can be displayed at one time on the display 16 is limited, but a buzzer or the like is provided. Thus, a notification method can be selected in which, by sounding the buzzer, notification is given that an error has occurred, and, among the error information acquired in step 570, only the type of the error is displayed on the display 16, or the like. Then, in step 574, notification of occurrence of an error is given by the error notification method determined in step 572, and the error occurrence interruption processing ends.

In this way, in the error occurrence interruption processing relating to the present embodiment, an error notification method which corresponds to the device environment is selected from among plural types of error notification methods, and notification that an error has arisen is given by the selected error notification method. Therefore, the present invention can be applied by implementing the image processing program group 34 relating to the present invention in computers 10 of various structures, and the applicability improves. Further, there is no need to carry out a setting changing operation, such as switching the processing at the time that an error arises or the like, in accordance with the structure of the computer 10 in which the image processing program group 34 is implemented (i.e., in accordance with whether it is an independent computer, or a computer implemented in any of various types of devices, or the like). Therefore, the burden of operation for implementation is lessened.

Here, although error processing is explained on the premise of interruption processing, the error processing is not limited to interruption processing. For example, the following structure may be used: when an error occurs, that module informs the error managing section 46C of error information, and a state code, which expresses that processing cannot be carried out with respect to the processing instructions thereafter, is returned. The processing managing section 46, which has received this information, returns this information to the application 32. The application 32 receives the error information from the error managing section 46C of the processing section 46, and on the basis thereof, itself carries out processing such as display or a buzzer or the like.

Description is given above of an example in which, although a reading request is inputted to the buffer module 40 from the following image processing module 38. In a case in which the data amount of the effective data which can be read by the image processing module 38 which is the source of the reading request, is less than the unit reading data amount, and the end of the effective data which can be read is not the end of the image data to be the object of processing, a data request is repeatedly inputted from the buffer module 40 to the workflow managing section 46A until either the data amount of the effective data which can be read is greater than or equal to the unit reading data amount, or it is sensed that the end of the effective data which can be read is the end of the image data which is the object of processing. However, the present invention is not limited to the same. In the above-described case, the buffer module 40 may input a data request to the workflow managing section 46A only one time, and may input an accumulation completed notice to the workflow managing section 46A either when the data amount of the effective data which can be read becomes greater than or equal to the unit reading data amount, or when it is sensed that the end of the effective data which can be read is the end of the image data which is the object of processing. Then, during the period of time from after the data request has been inputted from the buffer module 40 until the accumulation completed notice is inputted, the workflow managing section 46A may repeatedly input a processing request to the preceding image processing module 38 of that buffer module 40.

Figure 20:
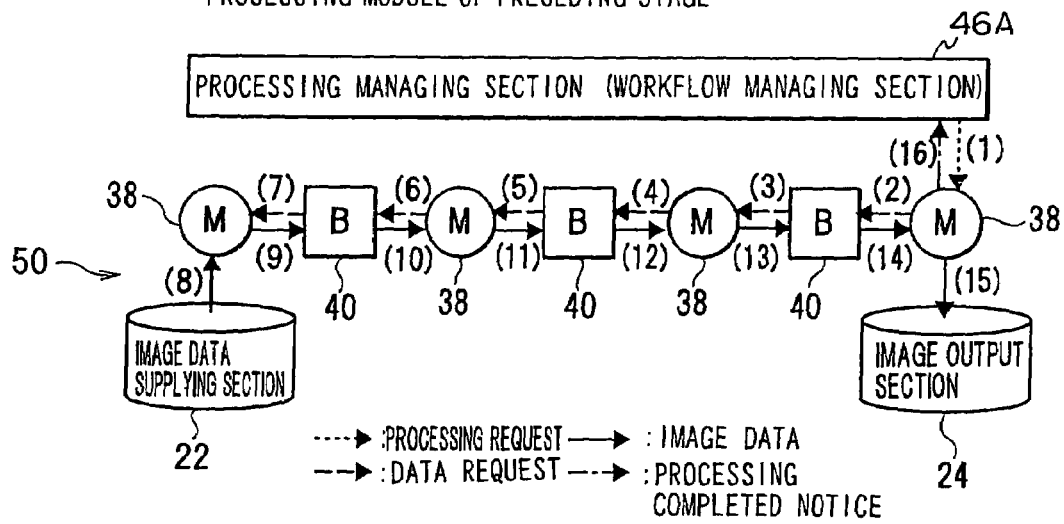
FIG. 20 is a schematic diagram explaining the flow of the block unit processing in an aspect in which the buffer module directly requests image data from the preceding image processing module.

Further, the above describes, as an example, an embodiment in which in a case in which a reading request is inputted from the following image processing module 38 and the effective data, which can be read by the image processing module 38 which is the source of the reading request, is not stored in the buffer 40A of its own module, the buffer control section 40B inputs a data request to the workflow managing section 46A. However, the present invention is not limited to the same, and in the above-described case, the buffer control section 40B may directly input a data request to the preceding image processing module 38. In this embodiment, the processing sequence in a case in which the form of execution of the image processing is block unit processing is shown in FIG. 20. As is clear from FIG. 20 as well, in this embodiment, it suffices for the workflow managing section 46A to input a processing request only to the image processing module 38 of the final stage in the image processing section 50, and therefore, the processing at the workflow managing section 46A is simple.

Further, as an example of image processing of a block unit, an embodiment is described above in which, first, the workflow managing section 46A inputs a processing request to the image processing module 38 of the final stage, and that processing request is successively transferred to preceding modules as a data request or a processing request. However, the present invention is not limited to the same. It is also possible to successively transfer the processing request or data request from the preceding modules to the following modules, and carry out image processing in block units. This can be realized as follows for example. The buffer control section 40B of the buffer module 40 is structured such that, each time image data is written to the buffer 40A by the preceding image processing module 38 of its own module, if the data amount of the effective data which can be read by the following image processing module 38 is less than the unit reading data amount and the end of the effective data which can be read is not the end of the image data which is the object of processing, the buffer control section 40B inputs the data request to the workflow managing section 46A. On the other hand, the buffer control section 40B inputs the accumulation completed notice to the workflow managing section 46A either when the data amount of the effective data which can be read becomes greater than or equal to the unit reading data amount, or when it is sensed that the end of the effective data which can be read is the end of the image data which is the object of processing. Moreover, the workflow managing section 46A is structured such that, after inputting a processing request to the image processing module 38 of the final stage of the image processing section 50, each time a data request is inputted from an arbitrary buffer module 40, the workflow managing section 46A inputs a processing request to the preceding image processing module 38 of the buffer module 40 which is the source of the data request. Each time an accumulation completed notice is inputted from an arbitrary buffer module 40, the workflow managing section 46A inputs a processing request to the following image processing module 38 of that buffer module 40. Further, in the above, it is possible for the data request from the buffer module 40 to be directly inputted as a processing request to the preceding image processing module 38 of that buffer module 40, and for the accumulation completion notice from the buffer module 40 to be directly inputted as a processing request to the following image processing module 38 of that buffer module 40.

Moreover, the above describes an embodiment in which, for the buffer module 40, the unit writing data amount is set in advance from the preceding image processing module 38, and the unit reading data amount is set in advance from the following image processing module. However, the present invention is not limited to the same. The data amount of writing or reading may be notified from the image processing module 38 each time of writing data to the buffer module 40 or reading data from the buffer module 40.

In the above configuration, each time a writing request or a reading request is inputted to the buffer module 40, the inputted request is registered in a queue as request information, and the request information is taken-out one-by-one from the queue and processed. In this way, exclusive control is realized in which, at the time of input of a writing request, if reading of data from the buffer 40A is being executed, after that data reading is completed, data writing processing corresponding to that writing request is carried out, and, at the time of input of a reading request, if writing of data to the buffer 40A is being executed, after that data writing is completed, data reading processing corresponding to that reading request is carried out. However, the present invention is not limited to the same. For example, exclusive control which uses a unit buffer region as a unit may be carried out. Namely, at the time of input of a writing request, if reading of data is being executed with respect to a unit buffer region of an object of writing in that writing request within the buffer 40A, after that data reading is completed, data writing processing corresponding to that writing request is carried out. Further, at the time of input of a reading request, if writing of data is being executed with respect to a unit buffer region of an object of reading in that reading request within the buffer 40A, after that data writing is completed, data reading processing corresponding to that reading request is carried out. Exclusive control which uses a unit buffer region as a unit can be realized by, for example, providing a queue at each individual unit buffer region and carrying out exclusive control, or the like.

Further, the above describes an example in which, among the individual image processing modules 38 whose programs are registered in the module library 36, programs, which correspond to the control sections 38B of the image processing modules 38 whose unit reading data amounts and unit writing data amounts are the same, are used in common. However, the present invention is not limited to the same. For example, the program corresponding to the control section 38B may be divided into a program which corresponds to a first control section which acquires image data from the preceding module and inputs it to the image processing engine 38A, a program which corresponds to a second control section which outputs to the preceding module data which is outputted from the image processing engine 38A, and a program which corresponds to a common control section which carries out control (e.g., communication with the workflow managing section 46A, or the like) which does not depend on the unit reading data amount, the unit processing data amount, or the unit writing data amount. At all of the image processing modules, the program corresponding to the common control section can be used in common. The program corresponding to the first control section can be used in common at image processing modules 38 whose unit reading data amounts are the same. The program corresponding to the second control section can be used in common at image processing modules 38 whose unit writing data amounts are the same.

Because the instance of the individual modules which structure the image processing section 50 are programs, the image processings by the image processing section 50 are realized by the CPU 12 in actuality. Here, the following system (so-called round robin system) may be used: the programs corresponding to the individual image processing modules 38 structuring the image processing section 50 are registered in a queue as processes, threads, or objects which are objects of execution by the CPU 12. Each time a program, which is registered in that queue and which corresponds to a specific image processing module, is taken-out from that queue by the CPU 12, it is judged whether or not image data of the unit processing data amount can be acquired from the preceding module of the specific image processing module 38. Only in cases in which is judged that the image data of the unit processing data amount can be acquired, the image data of the unit processing data amount is acquired from the preceding module of that specific image processing module 38. Predetermined image processing (processing corresponding to the image processing engine 38A of the specific image processing module 38) is carried out on the acquired image data of the unit processing data amount. Processing is carried out which outputs, to the following module of its own module, the image data which has undergone the predetermined image processing, or the processing results of the predetermined image processing. Thereafter, if processing on the entire image which is the object of processing is not finished, the taken-out program corresponding to the specific image processing module is re-registered in that queue as a process, thread, or object of the object of execution. Due to the CPU 12 repeating these unit image processings, the entire image which is the object of processing is processed by the image processing section 50.

What is claimed is:

1. An image processing device comprising:
   an image processing section, the image processing section having:
   (A) one or more image processing modules, each image processing module having:
      (1) an image processing engine that determines a fixed unit processing data amount specific to the image processing module and carries out a predetermined image processing on image data in the determined units of a fixed unit processing data amount, and
      (2) a control section inputting image data, which is acquired from a preceding stage of its own module, in data amount units needed in order for the image processing engine to carry out processing in determined fixed units of the unit processing data amount, and outputting, to a following stage of its own module, image data, which has undergone a predetermined image processing by the image processing engine, or processing results of the predetermined image processing in units of the determined fixed unit processing data amount; and
   (B) one or more buffer modules having a buffer for storing image data,
   the image processing section being constructed in response to an instruction of a desired image processing by a user and by individual modules being connected in a pipeline form or a directed acyclic graph form, such that the buffer module is connected at at least one of a preceding stage and a following stage of each image processing module which is selected, the one or more image processing modules being selected from a plurality of types of image processing modules, in order to construct the image processing section to perform the desired image processing, and
   the image processing engine of each image processing module having mutually different types or contents of image processings,
   the buffer module having a buffer control section,
   wherein the buffer control section:
   in a case in which an image processing module is connected at a following stage of its own module, recognizes a number of image processing modules which are connected at the following stage of its own module,
   receives from each of the following image processing modules a fixed read data amount which is specific to each of the following image processing modules and stores the respective fixed read data amount,
   stores, for each of the image processing modules, a head position of un-read image data among image data which is stored in the buffer, and
   each time image data is requested from an arbitrary following image processing module, acquires a fixed read data amount which is stored for the following image processing module which is a read request source, or which is designated each time image data is requested by the following image processing module, and carries out processing of making the following image processing module which is a read request source to read, in units of fixed read data amount, image data which is stored in the buffer, from the head position corresponding to the following image processing module which is the read request source.

2. The image processing device of claim 1, wherein the fixed unit processing data amount is set in advance in accordance with an operational environment or a type of the predetermined image processing which the image processing engine carries out.

3. The image processing device of claim 1, wherein the buffer control section, in a case in which an image processing module is connected at a preceding stage of its own module, carries out processing of causing image data, which is outputted from the preceding image processing module, to be written to a storage region on the buffer, the storage region on the buffer being able to store data of a fixed write data amount which is set in advance for its own module by the preceding image processing module or which is notified each time image data is outputted.

4. The image processing device of claim 3, wherein the control section of the image processing module, in a case in which the buffer module is connected at a following stage of its own module, sets in advance a fixed data amount of image data, which is obtained by the image processing engine carrying out the predetermined image processing on image data of the fixed unit processing data amount, as the fixed write data amount at the buffer module of the following stage, and thereafter, the control section of the image processing module carries out processing of writing image data of the fixed write data amount to a storage region on the buffer each time that image data of the fixed set write data amount is acquired due to the image processing engine carrying out the image processing.

5. The image processing device of claim 1, wherein the control section of the image processing module, in a case in which the buffer module is connected at a preceding stage of its own module, sets in advance the fixed unit processing data amount as the fixed read data amount at the preceding buffer module.

6. The image processing device of claim 1, further comprising a constructing section which constructs the image processing section on the basis of attributes of an image which is an object of processing and processing parameters which designate a type of image processing to be executed, the constructing section notifying individual buffer modules of numbers of image processing modules connected at following stages of the individual buffer modules included in the image processing section which is constructed,
   wherein, on the basis of notification from the constructing section, the buffer control sections of the buffer modules recognize the numbers of image processing modules connected at the following stages of their own modules.

7. The image processing device of claim 1, wherein
   the buffer is an aggregate of a plurality of storage regions which are reserved, in units of a given size, by the buffer module from a memory provided at the image processing device, and
   each time a new storage region for storing image data is needed, the buffer control section of the buffer module reserves a storage region of a given size from the memory, and in a case in which an image processing module is connected at a following stage of its own module, the buffer control section frees storage regions at which stored image data has all been read by all of the following image processing modules.

8. The image processing device of claim 1, further comprising a processing managing section which causes the image processing section to process an entire image which is an object of processing by, at each image processing module of the image processing section, causing repeating of a unit processing of inputting image data acquired from a preceding stage of its own module to the image processing engine and outputting, to a following stage of its own module, image data which has undergone a predetermined image processing by the image processing engine or processing results of the predetermined image processing.

9. The image processing device of claim 8, wherein, in a case in which execution of whole image processing is instructed, the processing managing section carries out, in order from an upstream-most image processing module of the image processing section, causing a specific image processing module to repeat the unit processing until image data corresponding to the entire image which is the object of processing is outputted from the specific image processing module.

10. An image processing method carrying out image processing by an image processing device having an image processing section, the image processing section having:
  (A) one or more image processing modules, each image processing module having:
    (1) an image processing engine that determines a fixed unit processing data amount specific to the image processing module and carries out a predetermined image processing on image data in the determined units of a fixed unit processing data amount, and
    (2) a control section inputting image data, which is acquired from a preceding stage of its own module, in data amount units needed in order for the image processing engine to carry out processing in determined fixed units of the unit processing data amount, and outputting, to a following stage of its own module, image data, which has undergone a predetermined image processing by the image processing engine, or processing results of the predetermined image processing in units of the determined fixed unit processing data amount; and
  (B) one or more buffer modules having a buffer for storing image data,
  the image processing section being constructed in response to an instruction of a desired image processing by a user and by individual modules being connected in a pipeline form or a directed acyclic graph form, such that the buffer module is connected at at least one of a preceding stage and a following stage of each image processing module which is selected, the one or more image processing modules being selected from a plurality of types of image processing modules, in order to construct the image processing section to perform the desired image processing, and
  the image processing engine of each image processing module having mutually different types or contents of image processions,
  the method comprising the steps of causing the buffer module to:
  in a case in which an image processing module is connected at a following stage of its own module, recognize a number of image processing modules which are connected at the following stage of its own module,
  receive from each of the following image processing modules a fixed read data amount which is specific to each of the following image processing modules and to store the respective fixed read data amount,
  store, for each of the following image processing modules, a head position of un-read image data among image data which is stored in the buffer, and
  each time image data is requested from an arbitrary following image processing module acquire a fixed read amount, which is stored for the following image processing module which is a read request source, or which is designated each time image data is requested by the following image processing module, and carry out a processing of making the following image processing module which is a read request source to read, in units of the read data image data which is stored in the buffer, from the head position corresponding to the following image processing module which is the read request source.

11. A computer-readable storage medium storing an image processing program for making a computer function as an image processing device having an image processing section, the image processing section having:
  (A) one or more image processing modules, each image processing module having:
    (1) an image processing engine that determines a fixed unit processing data amount specific to the image processing module and carries out a predetermined image processing on image data in the determined units of a fixed unit processing data amount, and
    (2) a control section inputting image data, which is acquired from a preceding stage of its own module, in data amount units needed in order for the image processing engine to carry out processing in determined fixed units of the unit processing data amount, and outputting, to a following stage of its own module, image data, which has undergone a predetermined image processing by the image processing engine, or processing results of the predetermined image processing in units of the determined fixed unit processing data amount; and,
  (B) one or more buffer modules having a buffer for storing image data,
  the image processing section being constructed in response to an instruction of a desired image processing by a user and by individual modules being connected in a pipeline form or a directed acyclic graph form, such that the buffer module is connected at at least one of a preceding stage and a following stage of each image processing module which is selected, the one or more image processing modules being selected from a plurality of types of image processing modules, in order to construct the image processing section to perform the desired image processing, and
  the image processing engine of each image processing module having mutually different types or contents of image processings,
  the buffer module having a buffer control section,
  wherein the buffer control section:
  in a case in which an image processing module is connected at a following stage of its own module, recognizes a number of image processing modules which are connected at the following stage of its own module,
  receives from each of the following image processing modules a fixed read data amount which is specific to each of the following image processing modules and stores the respective fixed read data amount, stores, for each of the following image processing modules, a head position of un-read image data among image data which is stored in the buffer, and each time image data is requested from an arbitrary following image processing module, acquires a fixed read data amount, which is stored for the following image processing module which is a read request source, or which is designated each time image data is requested by the following image processing module which is a read request source to read, in units of fixed read data amount, image data which is stored in the buffer, from the head position corresponding to the following image processing module which is the read request source.

* * * * *